United States Patent
Charlton et al.

(10) Patent No.: US 10,565,795 B2
(45) Date of Patent: Feb. 18, 2020

(54) VIRTUAL VISION SYSTEM

(71) Applicant: Snap Inc., Venice, CA (US)

(72) Inventors: Ebony James Charlton, Santa Monica, CA (US); Jokubas Dargis, Santa Monica, CA (US); Eitan Pilipski, Los Angeles, CA (US); Dhritiman Sagar, Marina del Rey, CA (US); Victor Shaburov, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/654,429

(22) Filed: Jul. 19, 2017

(65) Prior Publication Data

US 2018/0253901 A1    Sep. 6, 2018

Related U.S. Application Data

(60) Provisional application No. 62/467,693, filed on Mar. 6, 2017.

(51) Int. Cl.
| | |
|---|---|
| G06T 19/00 | (2011.01) |
| A63F 13/213 | (2014.01) |
| A63F 13/428 | (2014.01) |
| G06T 15/00 | (2011.01) |

(52) U.S. Cl.
CPC .......... *G06T 19/006* (2013.01); *A63F 13/213* (2014.09); *A63F 13/428* (2014.09); *G06T 19/003* (2013.01); *G06T 15/00* (2013.01)

(58) Field of Classification Search
CPC ................ G06T 19/006; G06Q 30/0643
See application file for complete search history.

(56) References Cited

U.S. PATENT DOCUMENTS

| | | |
|---|---|---|
| 666,223 A | 1/1901 | Shedlock |
| 6,334,149 B1 | 12/2001 | Davis, Jr. et al. |
| 6,487,601 B1 | 11/2002 | Hubacher et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,684,238 B1 | 1/2004 | Dutta |

(Continued)

FOREIGN PATENT DOCUMENTS

| | | |
|---|---|---|
| WO | WO-2016179166 A1 | 11/2016 |
| WO | WO-2018165154 A1 | 9/2018 |

OTHER PUBLICATIONS

"International Application Serial No. PCT/US2018/021139, International Search Report dated Jun. 7, 2018", 2 pgs.

(Continued)

*Primary Examiner* — Jeffery A Brier
(74) *Attorney, Agent, or Firm* — Schwegman Lundberg & Woessner, P.A.

(57) ABSTRACT

A context based augmented reality system can be used to display augmented reality elements over a live video feed on a client device. The augmented reality elements can be selected based on a number of context inputs generated by the client device. The context inputs can include location data of the client device and location data of nearby physical places that have preconfigured augmented elements. The preconfigured augmented elements can be preconfigured to exhibit a design scheme of the corresponding physical place.

20 Claims, 19 Drawing Sheets

(56) References Cited

U.S. PATENT DOCUMENTS

| | | | |
|---|---|---|---|
| 6,720,860 B1 | 4/2004 | Narayanaswami | |
| 6,832,222 B1 | 12/2004 | Zimowski | |
| 6,959,324 B1 | 10/2005 | Kubik et al. | |
| 6,970,907 B1 | 11/2005 | Ullmann et al. | |
| 7,072,963 B2 | 7/2006 | Anderson et al. | |
| 7,188,143 B2 | 3/2007 | Szeto | |
| 7,237,002 B1 | 6/2007 | Estrada et al. | |
| 7,240,089 B2 | 7/2007 | Boudreau | |
| 7,280,658 B2 | 10/2007 | Amini et al. | |
| 7,349,768 B2 | 3/2008 | Bruce et al. | |
| 7,454,442 B2 | 11/2008 | Cobleigh et al. | |
| 7,508,419 B2 | 3/2009 | Toyama et al. | |
| 7,650,231 B2 | 1/2010 | Gadler | |
| 7,856,360 B2 | 12/2010 | Kramer et al. | |
| 8,032,586 B2 | 10/2011 | Challenger et al. | |
| 8,090,351 B2 | 1/2012 | Klein | |
| 8,161,115 B2 | 4/2012 | Yamamoto | |
| 8,280,406 B2 | 10/2012 | Ziskind et al. | |
| 8,287,380 B2 | 10/2012 | Nguyen et al. | |
| 8,301,159 B2 | 10/2012 | Hamynen et al. | |
| 8,326,315 B2 | 12/2012 | Phillips et al. | |
| 8,402,097 B2 | 3/2013 | Szeto | |
| 8,594,680 B2 | 11/2013 | Ledlie et al. | |
| 8,613,089 B1 | 12/2013 | Holloway et al. | |
| 8,660,369 B2 | 2/2014 | Llano et al. | |
| 8,732,168 B2 | 5/2014 | Johnson | |
| 8,768,876 B2 | 7/2014 | Shim et al. | |
| 8,886,227 B2 | 11/2014 | Schmidt et al. | |
| 8,972,357 B2 | 3/2015 | Shim et al. | |
| 9,020,745 B2 | 4/2015 | Johnston et al. | |
| 9,119,027 B2 | 8/2015 | Sharon et al. | |
| 9,143,382 B2 | 9/2015 | Bhogal et al. | |
| 9,439,041 B2 | 9/2016 | Parvizi et al. | |
| 9,450,907 B2 | 9/2016 | Pridmore et al. | |
| 9,710,821 B2 | 7/2017 | Heath | |
| 9,854,219 B2 | 12/2017 | Sehn | |
| 2010/0100568 A1 | 4/2010 | Papin et al. | |
| 2012/0208564 A1 | 8/2012 | Clark et al. | |
| 2014/0109115 A1* | 4/2014 | Low | G06F 9/541 719/328 |
| 2014/0123062 A1* | 5/2014 | Nguyen | G01C 21/3611 715/810 |
| 2014/0379248 A1 | 12/2014 | Garin et al. | |
| 2015/0178257 A1* | 6/2015 | Jones | G06F 17/241 345/419 |
| 2015/0193982 A1 | 7/2015 | Mihelich et al. | |
| 2016/0169687 A1* | 6/2016 | Yu | H04W 4/02 701/468 |
| 2016/0292926 A1 | 10/2016 | Rosenthal et al. | |
| 2016/0313732 A1* | 10/2016 | Seydoux | G02B 27/0172 |
| 2017/0061308 A1 | 3/2017 | Chen et al. | |

OTHER PUBLICATIONS

"International Application Serial No. PCT/US2018/021139, Written Opinion dated Jun. 7, 2018", 5 pgs.

\* cited by examiner

VIRTUAL VISION SYSTEM

RELATED APPLICATIONS

This application claims the priority benefit of U.S. Provisional Application No. 62/467,693, entitled "Context Based Augmented Reality System," filed on Mar. 6, 2017, which is hereby incorporated by reference in its entirety.

TECHNICAL FIELD

Embodiments of the present disclosure relate generally to generating interactive content and, more particularly, but not by way of limitation, to a context based computer vision system.

BACKGROUND

Digital devices (e.g., smartphones, tablets, laptops) can be used as navigation devices to display locations of physical places (e.g., restaurants, stores). However, such displays often lack interactivity and customization, which results in poor user experience.

BRIEF DESCRIPTION OF THIS DRAWINGS

To easily identify the discussion of any particular element or act, the most significant digit or digits in a reference number refer to the figure ("FIG.") number in which that element or act is first introduced.

DETAILED DESCRIPTION

Figure 1:
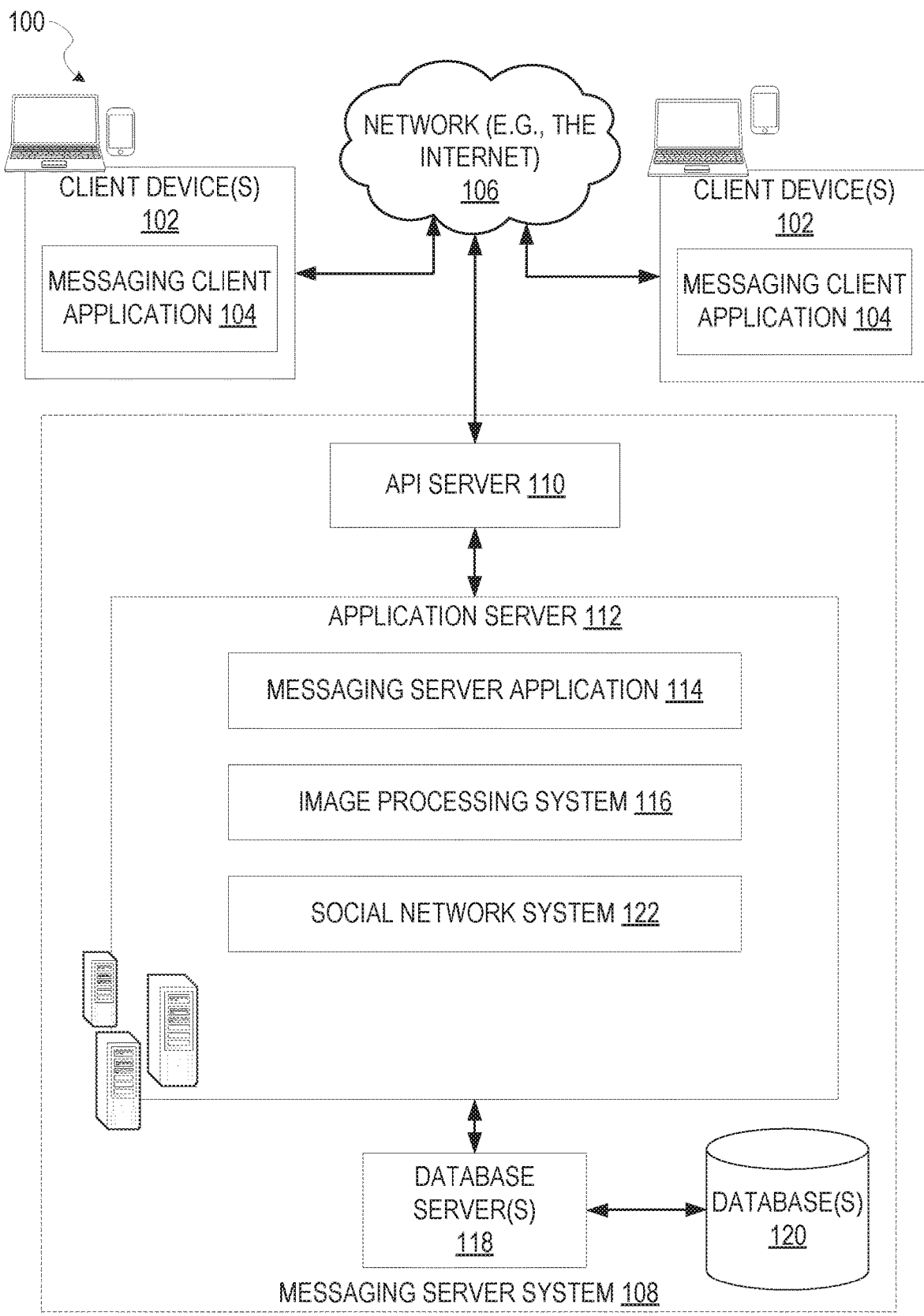
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Digital devices (e.g., smartphones, tablets, laptops) can be used as navigation devices to display locations of physical places (e.g., restaurants, arenas), however, such displays often lack interactivity and customization which results in poor user experience. To improve user experience, a context based augmented reality (AR) system can be used to display custom display elements on a live feed (e.g., video stream) that are based on the context of a given user's situation and geographic location. Although a live video feed is discussed below, it is appreciated that the lens data can be selected for overlay over single images in a similar manner.

According to some example embodiments, the user can use an application on his/her phone client device to view live video being captured by a backside camera of the phone. The video is dynamically captured and displayed on the screen of the phone. The application then determines the context of the user by analyzing the current time of day, the user's geographic location, recognized items being displayed in the live feed, audio data of the user's environment; and/or other data (e.g., Win access, Bluetooth® beacon data) to select a lens for display on the live feed. The lens is a video filter that overlays display elements on the live feed. The display elements may be custom to the general area in which the user is located (e.g., a city, a mall with many stores), the sub-area location of the user (e.g., a certain store within a mall), or custom to nearby locations. The nearby locations are physical places for which a lens has been created and associated, as is discussed in further detail below. In this way, the user can use his/her phone to view the world through the live feed and load location specific or physical place specific lenses based on the user's context with very little to no user input.

The term lens object (e.g. lens virtual object) refers to a package of data or virtual object (e.g., instantiation of a class) that either includes or references data specific to a given lens object. Data is included when it is stored with the lens object, whereas data is referenced by giving an address at which the data can be retrieved (e.g., over a network, locally on the client device). The data included or referenced may include preconfigured elements (e.g., text, avatars, cartoons, arrows), associations with specific context parameters (e.g., time, recognized items, general areas, sub-areas thereof). The associations with specific context parameters can be used to select a given lens object. For example, a lens object may specify that it is a lens object for a given city, and can be selected for use when the client device 102 is in the given city (e.g., OPS data indicates the client device 102 is in the given city). Further examples of preconfigured display elements are shown with reference to the user interfaces below.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations including transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 11) within the database 120. Examples of functions and services supported by the social network system 122 include the identification of other users of the messaging system 100 with whom a particular user has relationships or whom the particular user is "following", and also the identification of other entities and interests of a particular user.

The application server 112 is communicatively coupled to a database server 118, which facilitates access to a database 120 in which is stored data associated with messages processed by the messaging server application 114.

Figure 2:
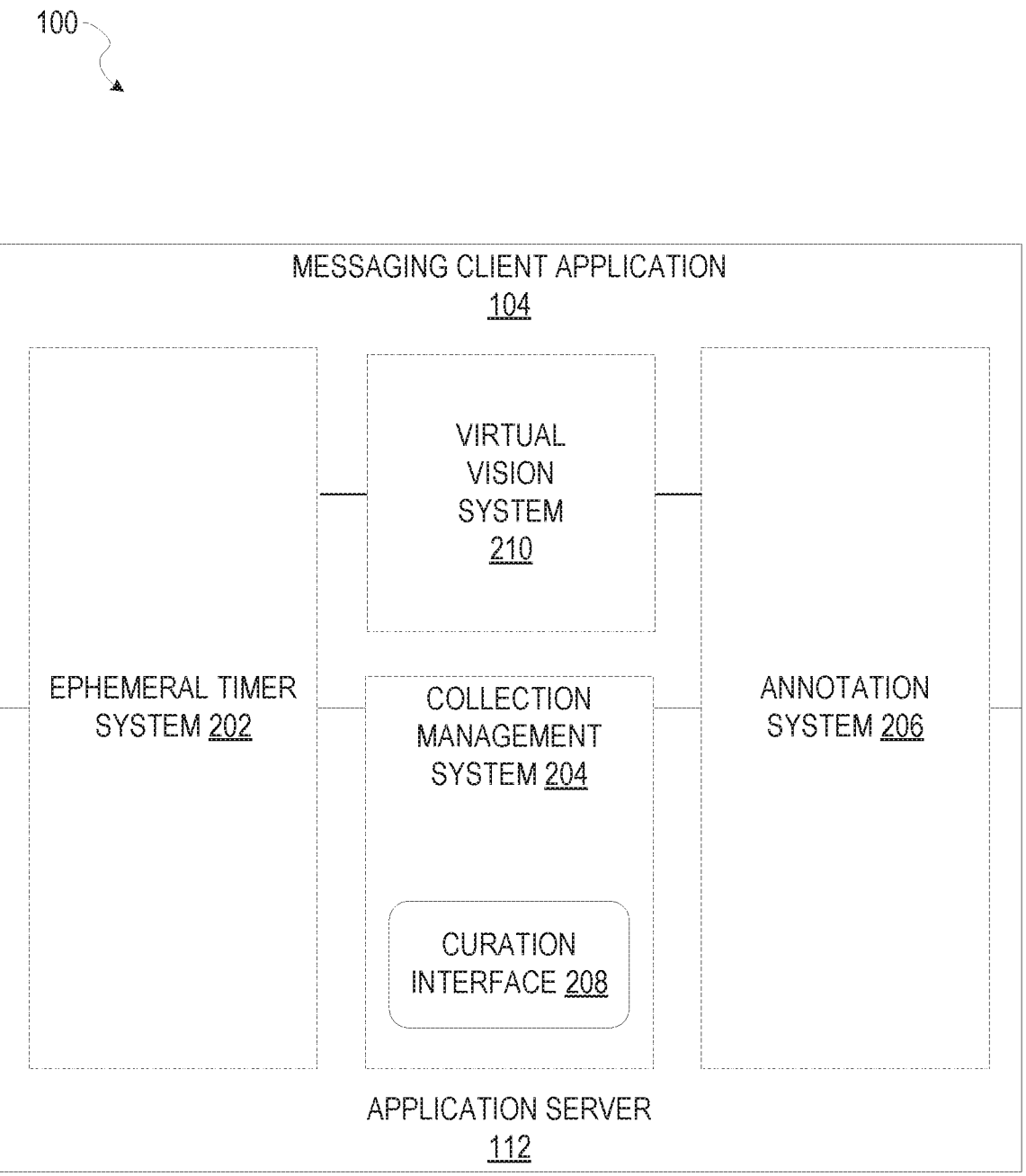
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a virtual vision system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story". Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The virtual vision system 210 manages tracking an object in different images, according to some example embodiments. Further details of the virtual vision system 210 are discussed below with reference to FIGS. 6-16. Although the virtual vision system 210 is illustrated in FIG. 2 as being integrated into the messaging client application 104, it is appreciated that in some example embodiments, the virtual vision system 210 is integrated into other systems, such as the application server 112. Further, in some example embodiments, some engines of the virtual vision system 210 may be integrated into the application server 112 (e.g., to provide server-side support for client-side requests) and some of the engines may be integrated into the client device 102 (e.g., to generate the client-side requests).

Figure 3:
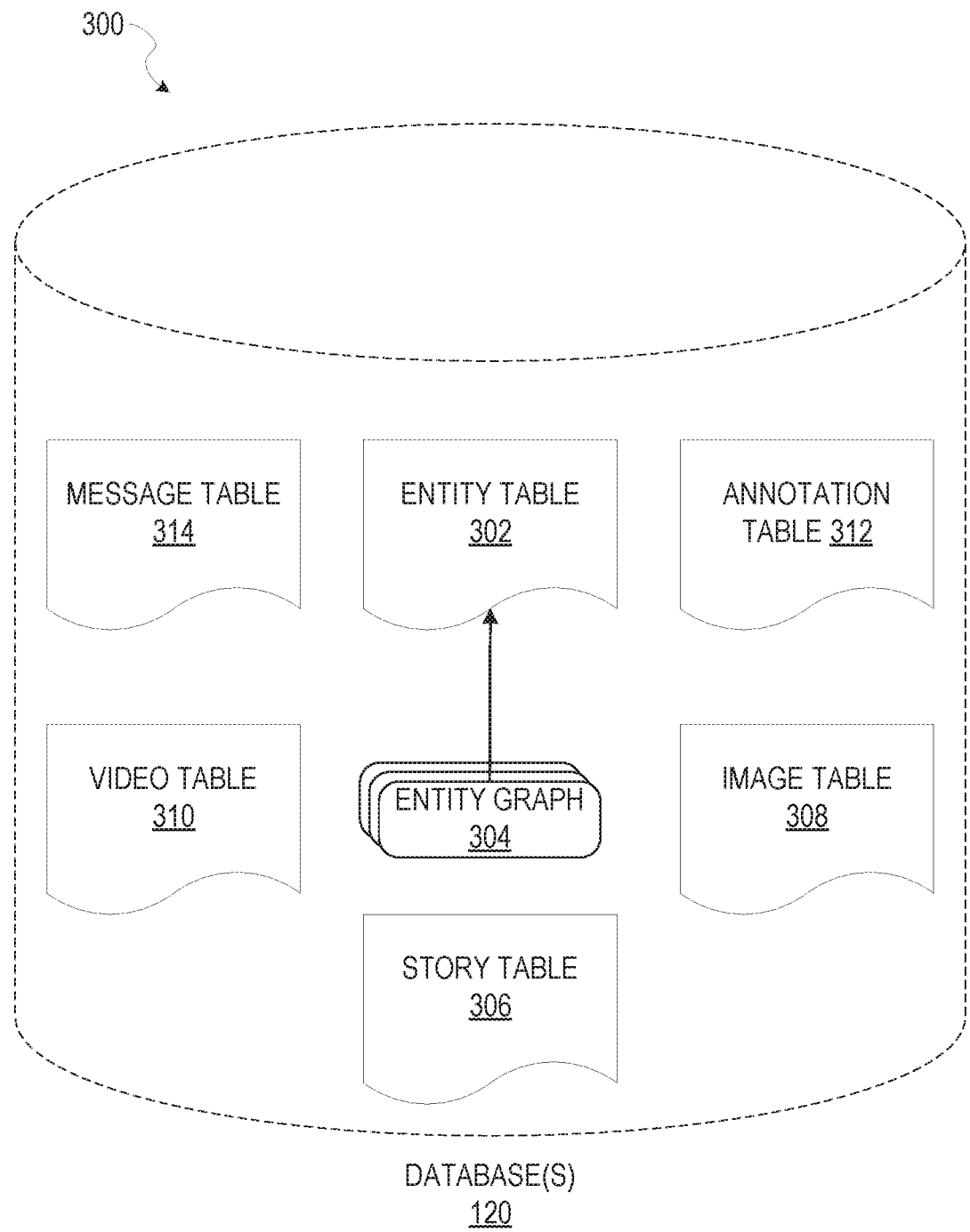
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story", which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
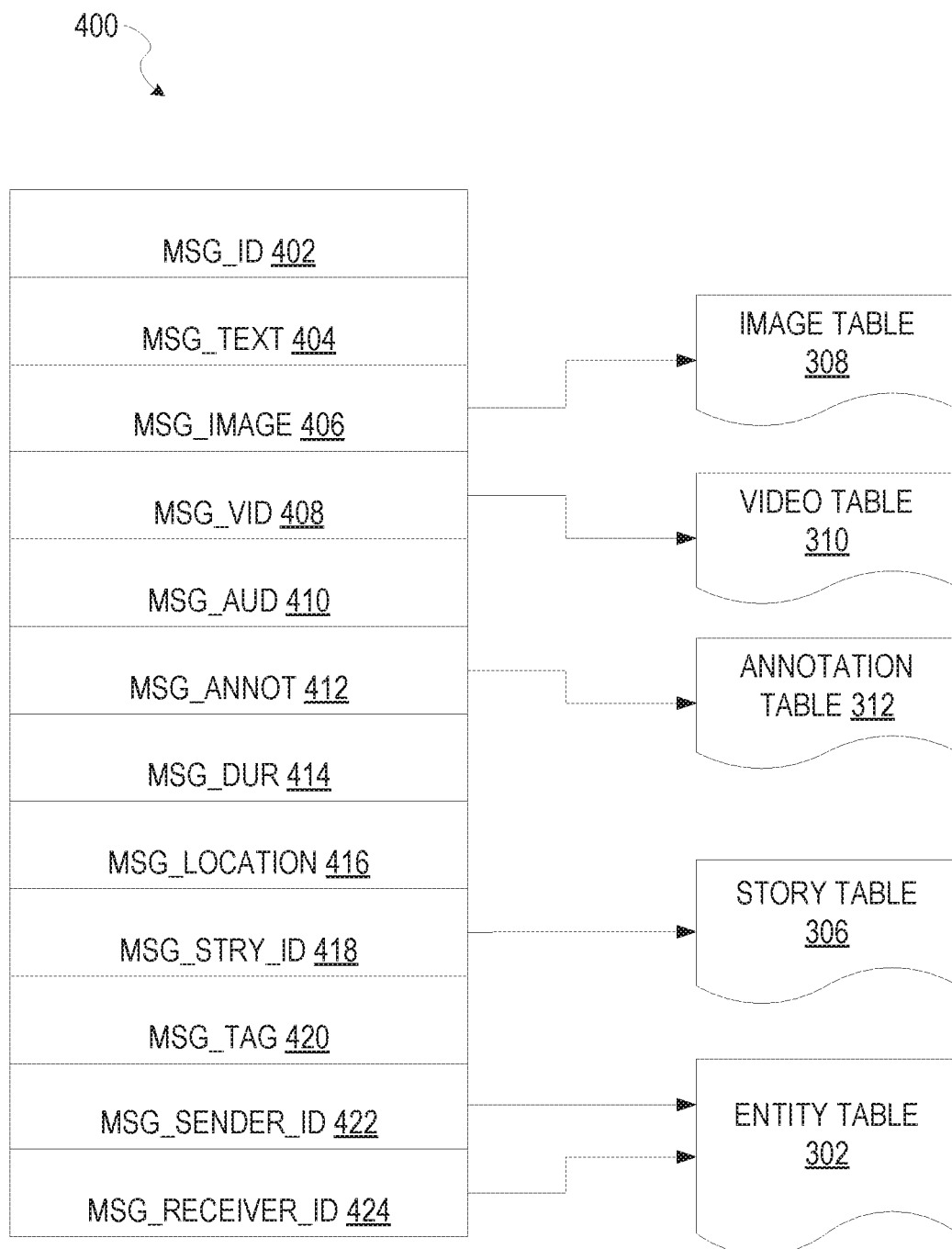
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
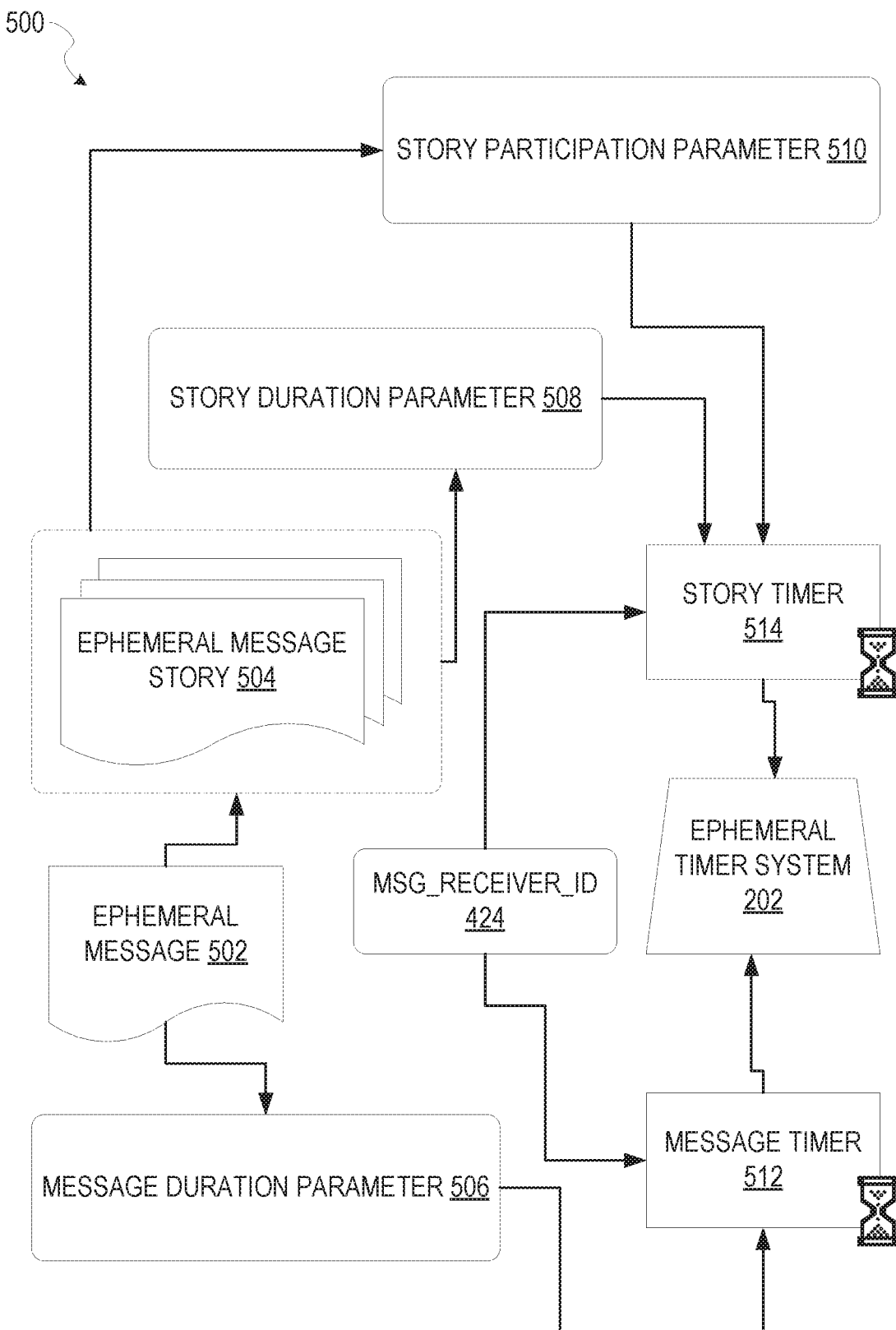
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral tinier system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
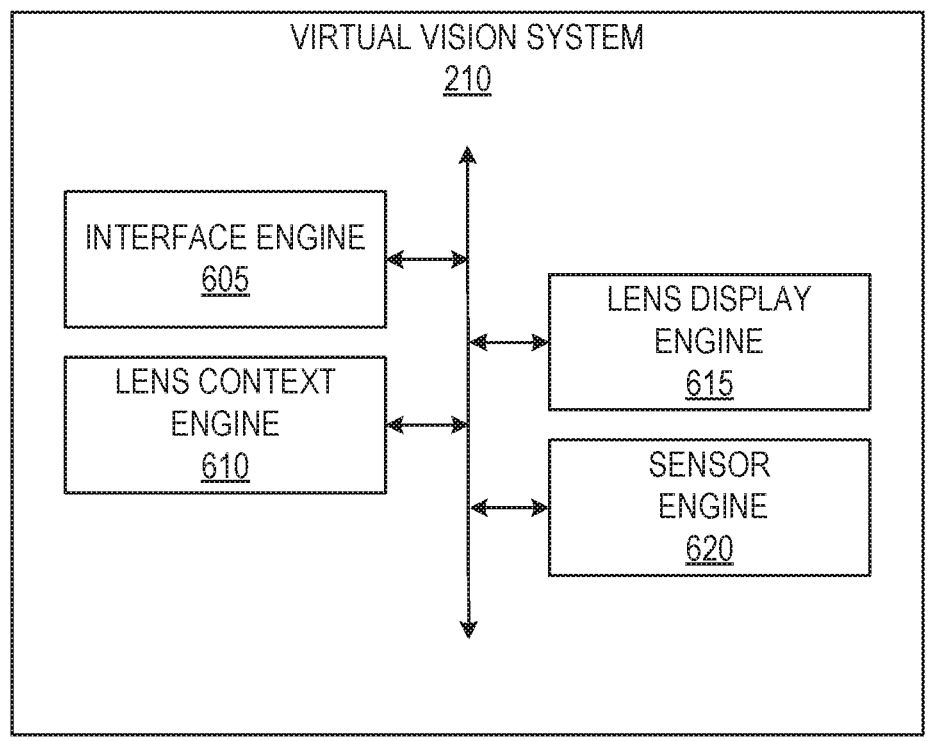
FIG. 6 is a block diagram showing example components provided within the system of FIG. 1, according to some example embodiments.

FIG. 6 illustrates a block diagram showing components provided within the virtual vision system 210, according to some embodiments. The components themselves are communicatively coupled (e.g., via appropriate interfaces) to each other and to various data sources, so as to allow information to be passed between the applications or so as to allow the applications to share and access common data. Furthermore, the components access the database 126 via the database server 124. As illustrated in FIG. 6, the virtual vision system 210 comprises an interface engine 605, a lens context engine 610, a lens display engine 615, and a sensor engine 620. Briefly, the interface engine 605 manages interacting with the server to retrieve lens object data for new locations, according to some example embodiments. Further, the interface engine 605 is configured to interact with the server to receive a lens object selected by a lens context engine 610 executing on the server, according to some example embodiments.

The lens context engine 610 receives input parameters and selects a lens object based on the parameters. The parameters include location data and contextual data, such as time of day or items recognized in images, as described in further detail below. The lens display engine 615 is configured to manage execution of the selected lens objects by displaying display elements over live video feed being displayed on the client device 102, according to some example embodiments.

The sensor engine 620 is configured to manage access to one or more sensors of the client device 102. For example, the sensor engine 620 can access a control to activate a backside camera of the client device 102, can access GPS data through a GPS sensor integrated into the client device 102, can access compass data through use of an accelerometer and gyro sensors of client device 102, can create audio data by accessing a microphone sensor of the client device 102, and can access the user interface control to visual data of the objects being displayed on the screen of the client device 102, according to some example embodiments.

According to some embodiments, one or more of the engines in the virtual vision system 210 can be integrated into the server-side context based augmented reality system 150 instead of the virtual vision system 210 on the client side. For example, if the lens context engine 610 is run from the server-side, then the client device 102 can generate context data (discussed in FIG. 10), send the context data to lens context engine 610 on the server-side, which then selects a lens object based on the received context data, as further discussed in FIG. 11.

Figure 7:
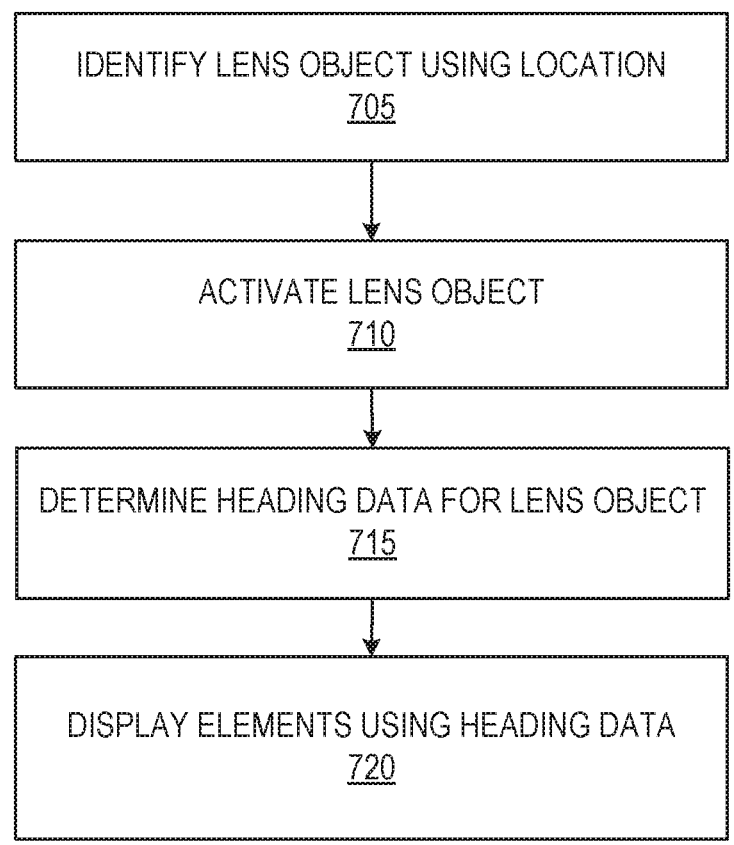
FIG. 7 shows a flow diagram of a method for implementing the virtual vision system, according to some example embodiments.

FIG. 7 shows a flow diagram of a method 700 for implementing the virtual vision system 210, according to some example embodiments. At operation 705, the lens context engine 610 identifies a lens object using at least location data provided from the client device 102. For example, the lens context engine 610 requests the current location data (e.g., latitude/longitude) by calling a GPS service integrated in the operating system (OS) of the client device 102. The lens context engine 610 then determines whether there are any lenses associated with the retrieved current location data. In some embodiments, lens data is locally stored on the client device 102. In those embodiments, the lens context engine 610 then matches the current location with a corresponding locally-stored lens object. In some embodiments, the lens context engine 610 contacts the server-side virtual vision system 210 to identify a lens. For example, if the user is in a new geographic area (e.g., new city), the client device 102 may not have any locally stored lens objects. As such, the interface engine 605 can submit the current location to the server 140 and receive, as a response, a lens object from the server-side virtual vision system 210.

At operation 710, the lens display engine 615 activates the lens object. In some embodiments, activation of the object includes identifying geographic coordinates stored in the object for a nearby physical place or destination. At operation 715, the sensor engine 620 generates heading data for the lens object. The heading data includes which direction the client device 102 is facing in degrees from North and latitude/longitude data, according to some example embodiments. The geographic coordinates of the physical place are compared to heading data of the client device 102 to determine how to direct the user to the physical place. For example, if the physical place is 0.3 miles bearing 30 degrees from North, the direction data can be used to select one or more of the preconfigured display elements of the lens object in the following operation.

At operation 720, the lens display engine 615 displays the display elements of the selected lens object using the heading data. Continuing the above example, the lens display engine 615 selects a leftward arrow and displays it on the live feed of the client device 102. Responsive to display of the leftward arrow the user may turn his client device 102 so that its bearing matches the bearing of the physical place (e.g., 30 degrees from North). When the physical place is displayed in the live feed, additional display elements can be overlaid on the live feed. In some example embodiments, the lens display engine 615 determines that the physical place is depicted in the live feed by determining when the bearing of the client device 102 matches that of the physical place. Additionally, the lens display engine 615 can use computer vision algorithms to actively scan the live feed for image feature data that matches the physical place image feature data. The image feature data for the physical place is included in the lens object data, and when the lens object is selected at operation 705, the image feature data of the physical place is loaded into computer vision algorithms of the lens display engine 615.

Figure 12A:
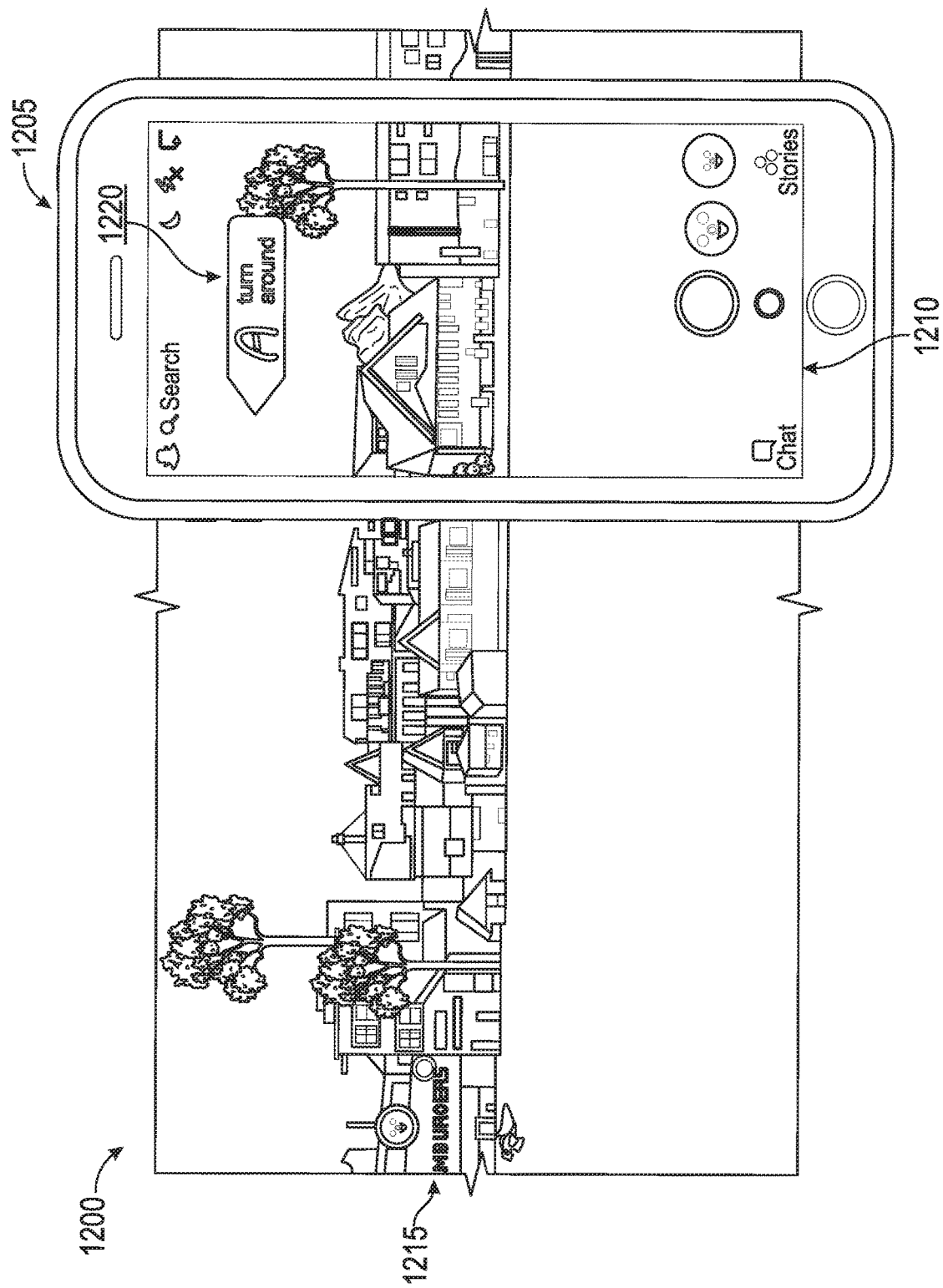
FIG. 12A-12B show example user interfaces for implementing a heading related lens object, according to some example embodiments.
Figure 12B:
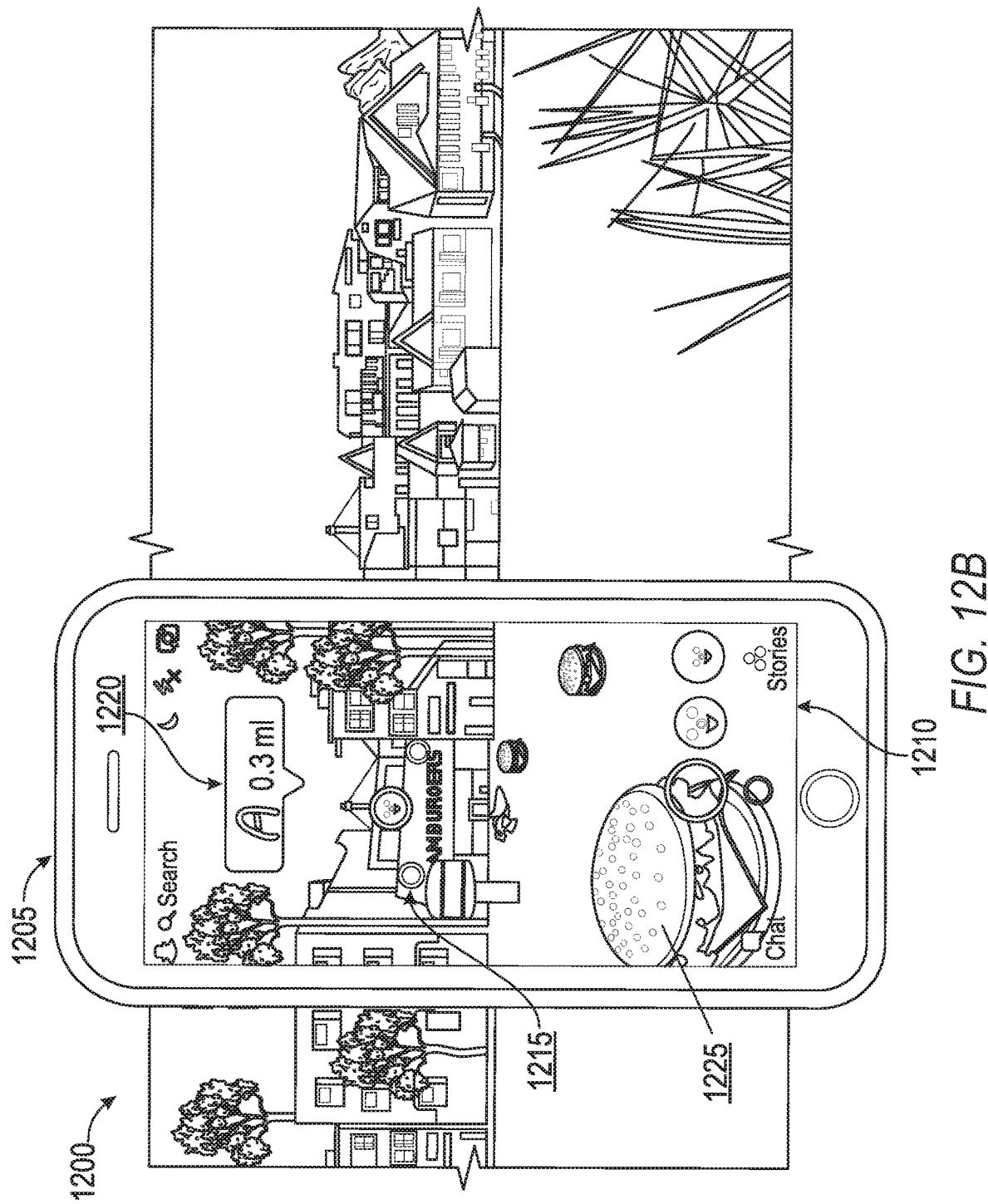

FIG. 12A-12B show example user interfaces 1200 for implementing an example of the method 700, according to some example embodiments. In FIG. 12A, the client device 102 is a smartphone 1205, which is executing an application (e.g., messaging client application 104) that is displaying a live feed 1210 of video captured by a backside camera (not depicted) of the smartphone 1205. As described above, the application determines the current location of the smartphone 1205, determines that there is a nearby physical place 1215 for which a lens object having display elements has been preconfigured. The application compares the bearing of the physical place 1215 to the bearing of the smartphone 1205, and selects a preconfigured display element 1220 that will minimize the difference between the two bearings. The preconfigured display element 1220 is preconfigured in that it exhibits a design scheme (e.g., Trademarks, color scheme, descriptive text) associated with the physical place 1215.

Responsive to the user turning his/her smartphone 1205 in the direction of the display element 1220, eventually the physical place 1215 will appear in the live feed 1210. When the physical place 1215 is in the live feed 1210, additional preconfigured display elements 1225, such as a trail of cartoon burgers, can show the user the route to the physical place 1215. The user interface 1210 further includes a capture image button displayed as a white circle in the center bottom of user interface 1210. Selecting the capture image button generates a image which can be posted to a social media platform managed from application server 112, through using a share button (not depicted) on the captured image. The image can depict the physical place 1215 with the preconfigured display elements (e.g., display element 1220) overlaid in front of the real world background (e.g., the burger restaurant, beach). In this way, the user can share the image with his/her social media friends to indicate the user is going to the physical place 1215, thereby allowing an interactive and share-able approach to navigation using display elements preconfigured for a physical place 1215. Other user interfaces (e.g., those depicted in FIG. 13-11) can likewise be imaged and shared using the same approach.

In some example embodiments, the preconfigured display elements 1220 are overlaid on the live feed 1210 even if the physical place 1215 is covered or otherwise obfuscated by other objects. For example, if a building is between the user of the client device 102 and the physical place 1215, when the user holds the client device 102 up so that the live feed 1210 shows a view of the building, display elements 1220 and 1225 can still be shown to indicate to the user that the physical place 1215 is behind the building.

Further, as illustrated, the preconfigured display element 1220 can be updated to indicate the distance to the physical place 1215 when the smartphone 1205's bearing matches the physical place 1215's bearing. In this way, through seamlessly selecting and displaying preconfigured display elements 1220, 1225, the user experience is made more interactive and custom with little to no user action.

Figure 8:
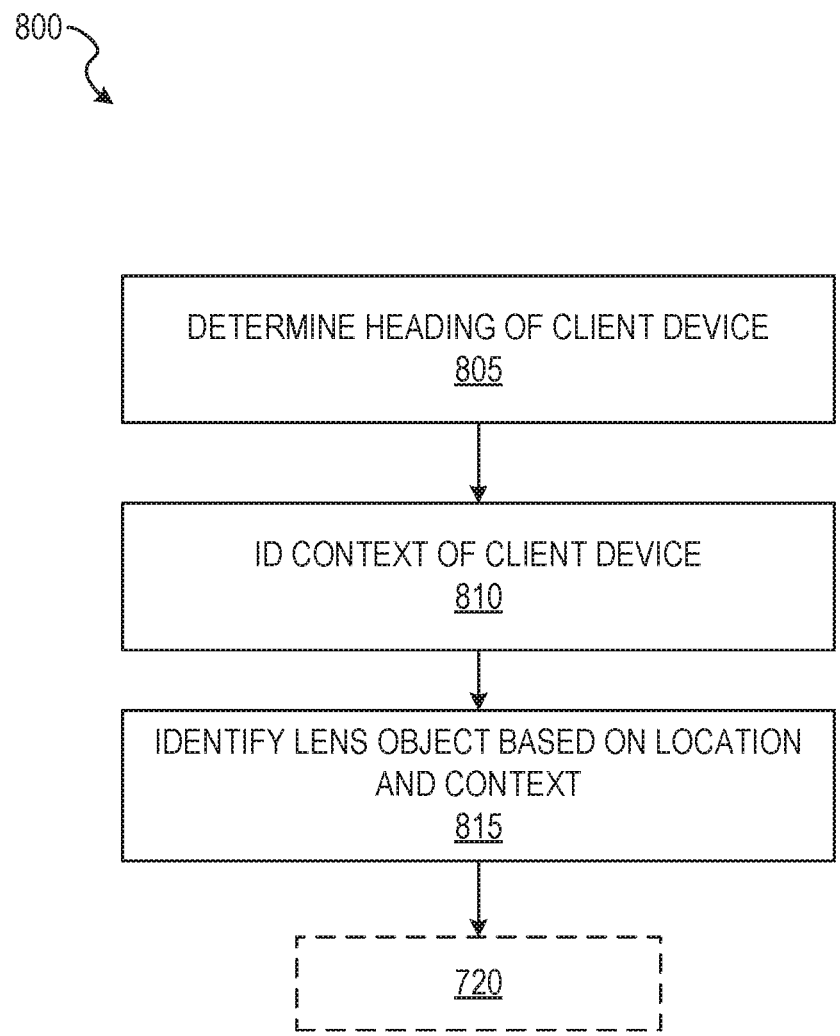
FIG. 8 shows a flow diagram of a method for selecting a lens object, according to some example embodiments.

FIG. 8 shows a flow diagram of a method 800 for selecting a lens object, according to some example embodiments. Method 800 comprises a more detailed approach to selecting a lens object. At operation 805, the sensor engine 620 determines the heading of the client device 102. The heading of the client device 102 can include the direction the client device 102 is facing in degrees with respect to North (e.g., 270 degrees from North). Further, in some example embodiments, the heading of the client device 102 can include geographic location data, such as the current latitude and longitude of the client device 102. At operation 810, the lens context engine 610 generates context parameters detailing the context of the client device 102. The context can include sensory inputs and time inputs from the client device 102. At operation 815, the lens context engine 610 uses the location data and context parameters to identify a lens object. Each of the lens objects may be associated with a specified set of one or more context parameters and a given current location of the client device 102. After operation 815, the method may return to operation 720 of FIG. 7 where display elements of the identified lens object are displayed, as discussed above.

Figure 9:
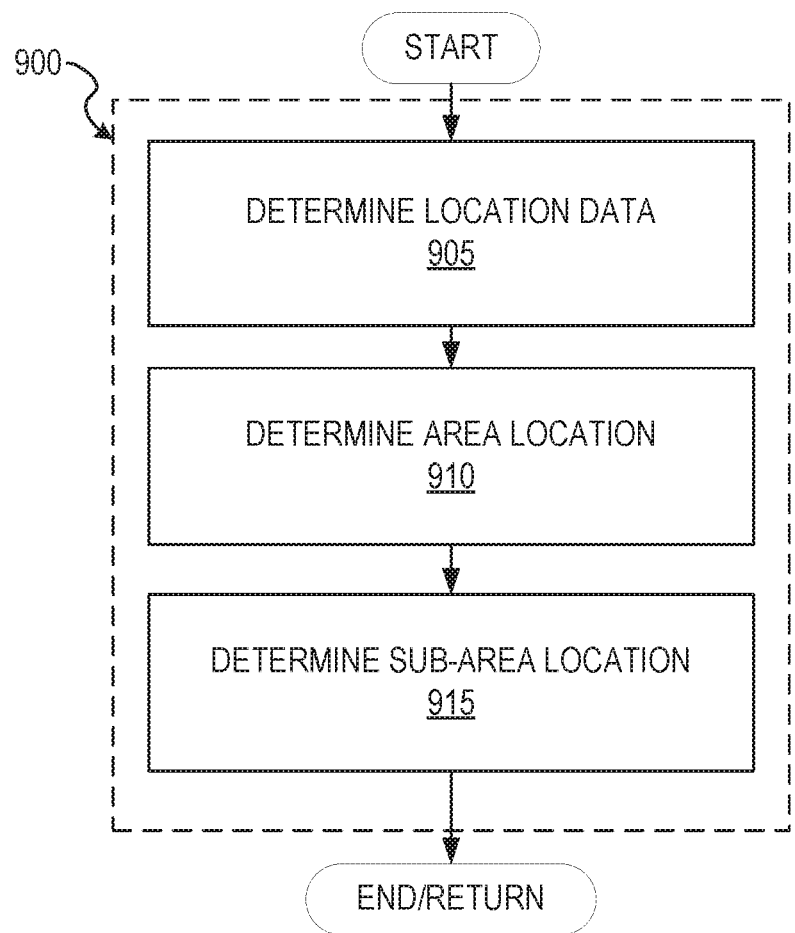
FIG. 9 shows a flow diagram of a method for determining geographic data, according to some example embodiments.

FIG. 9 shows a flow diagram of a method 900 for determining geographic data, according to some example embodiments. Method 900 is an example embodiment of operation 805. For example, the method 900 may be called as a sub-routine to complete operation 805. The start bar refers to the invocation of the method. The end or return bar outputs or otherwise stores the data generated from the preceding operations in memory. The method 900 may be referenced using a wrapper function that can be stored on the client device 102 or stored within the sensor engine 620. Calling the wrapper function executes multiple operations, such as those shown in method 900. At operation 905, the sensor engine 620 determines the heading data for the client device 102, including the geographic location of the client device 102 and the bearing of the client device 102. In some example embodiments, the GPS sensor of the client device 102 is utilized to generate the latitude and longitude data of the client device 102. Further, a compass sensor of the client device 102 is utilized to determine which direction in degrees the client device 102 is facing with respect to North.

At operation 910, the sensor engine 620 determines the general location or current area of the client device 102. For example, given a latitude and longitude for the current location, the client device 102 may determine that the client device 102 is in the general area of Venice, Calif. In some example embodiments, the latitude and longitude are sent to the server, and the server determines what the general area is for the client device 102 and returns the information as a response to the client device 102. Further, according to some example embodiments, the general area need not be a city, but a general area comprising more than one physical place 1215. For example, the general area may refer to a shopping mall having multiple stores.

At operation 915, the sensor engine 620 determines a sub area location of the client device 102. The sub-area is an area within the general area. For example, if the general area is a city (e.g., San Francisco), the sub-area can be a neighborhood in the city (e.g., Potrero Hill). As an additional example, if the area is a shopping mall, the sub-area can be a specific store within the shopping mall. In some example embodiments, the sub-areas are determined using the same mechanisms used to determine the general area (e.g., looking up the data locally on the client device 102, or sending location data to the server and receiving the sub-area as a response). Further, according to some example embodiments, the sensor engine 620 may determine the sub-area using location data from an enhanced location service, such as Foursquare™, to pinpoint the sub-area as a given store within a mall. Briefly, Foursquare™ is a service that can pinpoint a device's location by analyzing information available to the client device 102, such as current location, connected WiFi networks, nearby/available cell towers, nearby/available WiFi networks, and other information. The enhanced location service may be provided from a third party server. The sensor engine 620 sends a request to the server which then retrieves sub-area data from the third party server through the API server 110. The sub-area data is then sent back to the sensor engine 620 for further processing.

Figure 10:
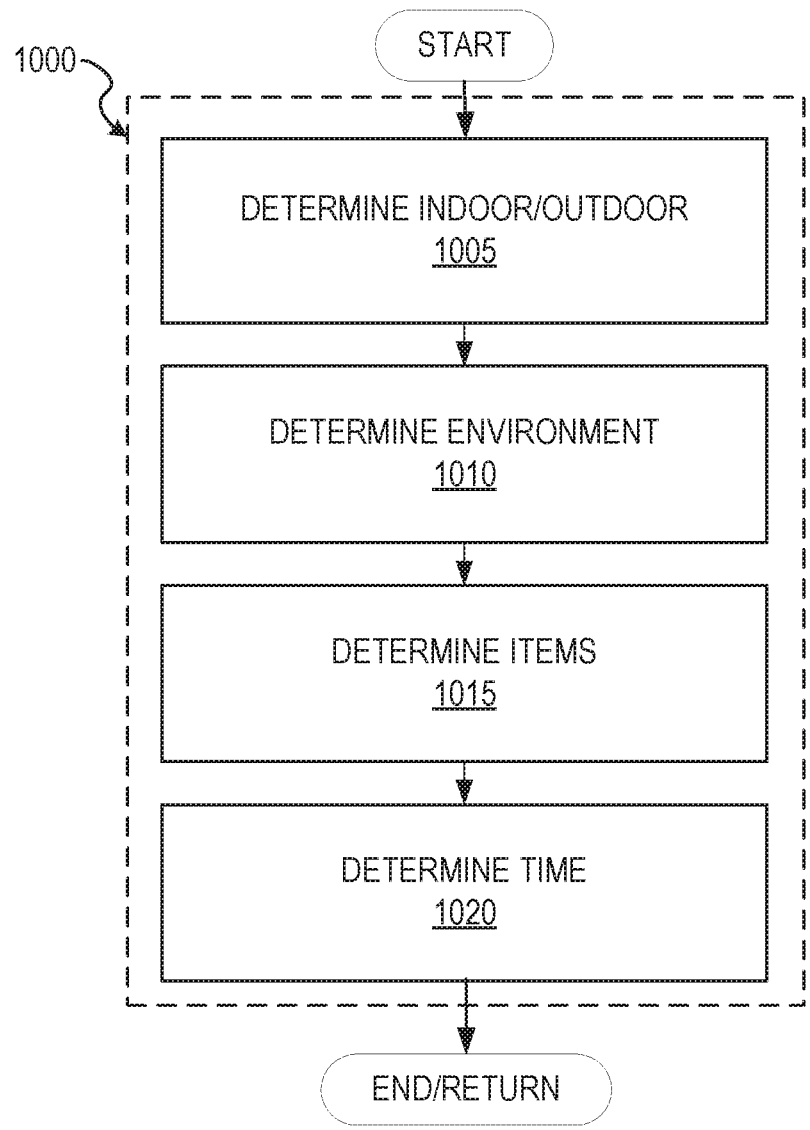
FIG. 10 shows a flow diagram of a method for determine context data, according to some example embodiments.

FIG. 10 shows a flow diagram of a method 1000 for determining context data, according to some example embodiments. Method 1000 is an example embodiment of operation 810. For example, the method 1000 may be called as a sub-routine to complete operation 810. The start bar refers to the invocation of the method. The end or return bar outputs or otherwise stores the data generated from the preceding operations in memory. The method 1000 may be referenced using a wrapper function that can be stored on the client device 102 or stored within the sensor engine 620. Calling the wrapper function executes multiple operations, such as those shown in method 1000. At operation 1005, the sensor engine 620 determines whether the client device 102 is indoors or outdoors based on computer vision analysis of the live feed 1210 displayed on the screen of the client device 102. For example, the sensor engine 620 can determine the light level of the surrounding environment by analyzing the pixel values of the frames in the live feed 1210. If the pixel levels indicate high levels of light, the sensor engine 620 determines that the client device 102 is outside. Whereas if the pixel levels indicate moderate to low levels of light, the sensor engine 620 determines that the client device 102 is inside. At operation 1010, the sensor engine 620 determines the environment (e.g., restaurant, beach, restroom) using audio data generated from the microphone of the client device 102. For example, the sensor engine 620 may use computer vision algorithms to recognize items being displayed in the live feed 1210. The recognized items (e.g., pool table, barstools, neon lights) are indicative of the type of the environment (e.g., dive bar) and can later be used to select a lens object based on the recognized items. Further, at operation 1010, the sensor engine 620 may access the microphone of the client device 102 to analyze audio data from the surrounding environment. For example, if the sensor engine 620 determines that the clanking sounds is dishes being clashed together, and there is a loud ambient sound level, the sensor engine 620 can then determine that the user is in a public setting, such as a restaurant. At operation 1015, the sensor engine 620 can further use the item recognition to provide context without determining the surrounding environment, as discussed in further detail below. At operation 1020, the sensor engine 620 can request the local time of the client device 102. The local time can be used to provide additional context information for selecting time-based lens objects (e.g., a morning oriented lens object, a happy-hour lens object, a late-night lens object).

Figure 11:
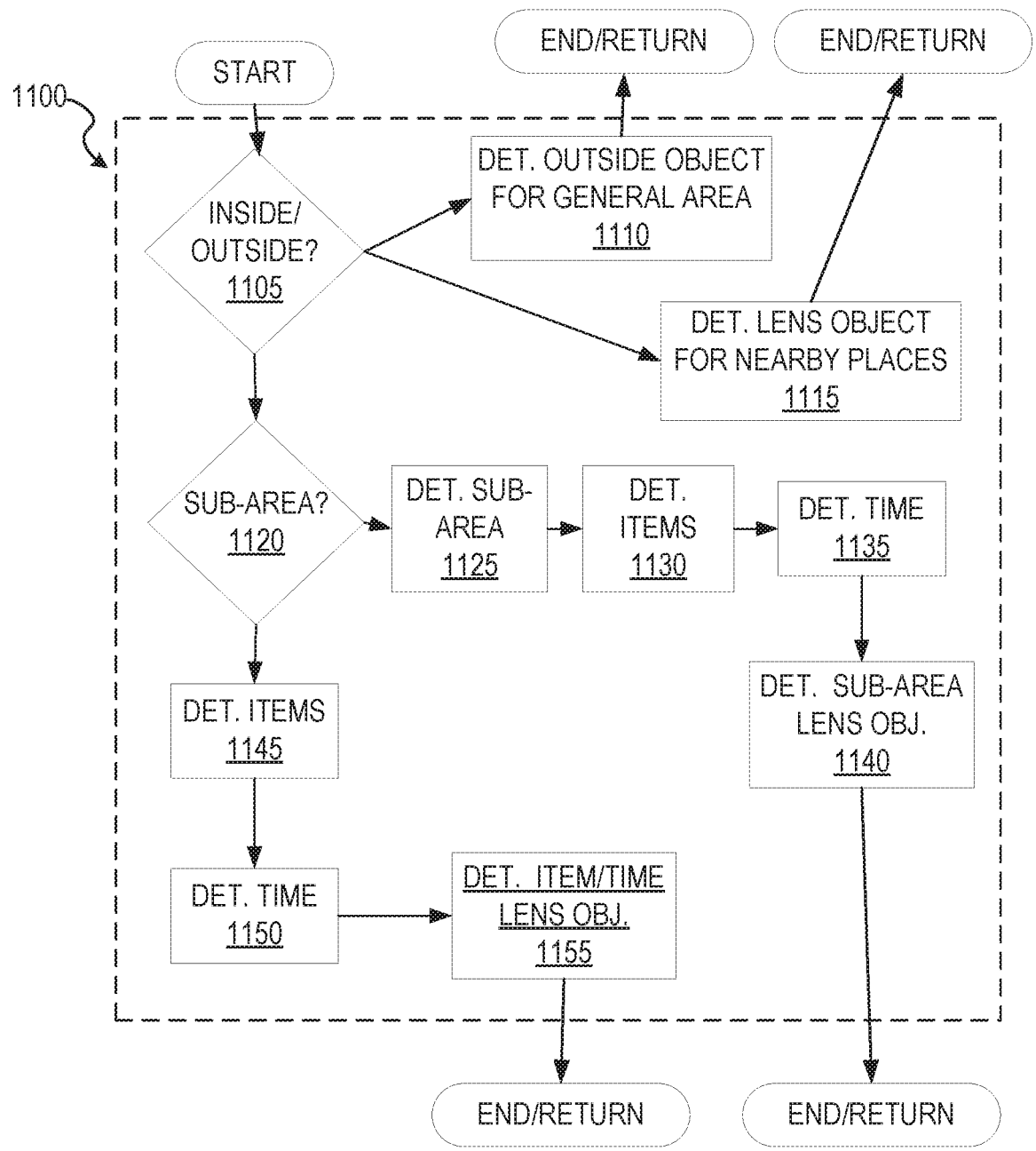
FIG. 11 shows a flow diagram of a method for determining a lens object, according to some example embodiments.

FIG. 11 shows a flow diagram of a method 1100 for determining a lens object, according to some example embodiments. Method 1100 is an example embodiment of operation 815. For example, the method 1100 may be called as a sub-routine to complete operation 815. The start bar refers to the invocation of the method. The end or return bar outputs or otherwise stores the data generated from the preceding operations in memory. The method 1100 may be referenced using a wrapper function that can be stored on the client device 102 or stored within the sensor engine 620. Calling the wrapper function executes multiple operations, such as those shown in method 1100. At operation 1105, the lens context engine 610 determines whether the client device 102 is inside or outside. For example, the lens context engine 610 can analyze image or pixel data from the live feed 1210 and if the pixels are blue or lighting is bright, determine the client device 102 to be outside. If the lens context engine 610 determines that the client device 102 is outside, then at operation 1110, the lens context engine 610 selects an outside lens object for the general area of the current location of the client device 102.

In some example embodiments, if the lens context engine 610 determines that the client device 102 is outside but that there are no lens objects for the generalized area, then the lens context engine 610 performs a search (via server 150) for lens objects associated with locations near to the current location of the client device 102 at operation 1115. Once a lens object for a nearby location is identified, it can be displayed using preconfigured display elements 1220, 1225 as discussed with reference to FIGS. 12A and 12B above.

Continuing from decision operation 1105, if lens context engine 610 determines that the client device 102 is inside, the lens context engine 610 continues to decision operation 1120, where the lens context engine 610 analyzes whether the client device 102 is located within a sub-area of the general area as described above (e.g., by programmatically accessing an enhanced location service through an API). Assuming that the client device 102 is inside a sub-area of the general area, the method continues to operation 1125, where the lens context engine 610 determines the sub-area of the client device 102. At operation 1130, the lens context engine 610 determines items depicted in the live feed 1210 or image. At operation 1135, the lens context engine 610 determines the local time of the client device 102. At operation 1140, the lens context engine 610 uses the sub-area, the items, and/or the time to select a lens object.

Continuing from decision operation 1120, assuming the client device 102 is not in a sub-area, then at operation 1145, the lens context engine 610 determines items depicted in the live feed 1210 or image. At operation 1150, the lens context engine 610 determines the local time of the client device 102. At operation 1155, the lens context engine 610 selects a lens object using the depicted items and or time.

Figure 13:
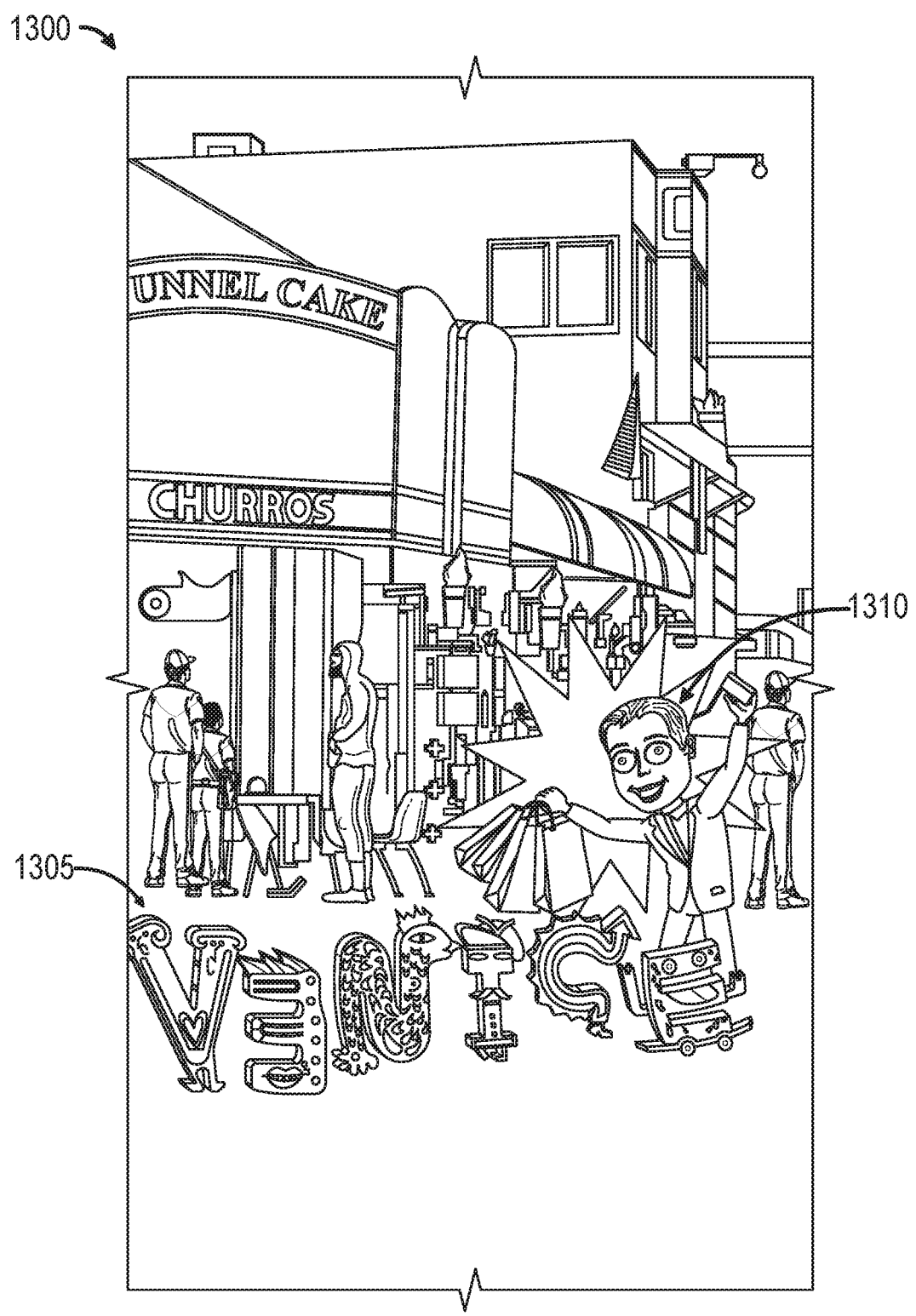
FIG. 13 shows an example user interface for implementing an outdoors related lens objected, according to some example embodiments.

FIG. 13 shows an example user interface 1300 for implementing an outdoors related lens object, according to some example embodiments. The lens object of FIG. 13 is selected at operation 1110 in which the lens context engine 610 determines that the client device 120 is outside in the general area of Venice Beach. The preconfigured display elements for the selected lens object include a city related display element 1305 which recites "Venice", and an avatar 1310 for the user of the client device 102, which has been preconfigured to show the avatar 1310 on a shopping spree on the main thoroughfare of the general area (e.g., the Venice Boardwalk).

Figure 14:
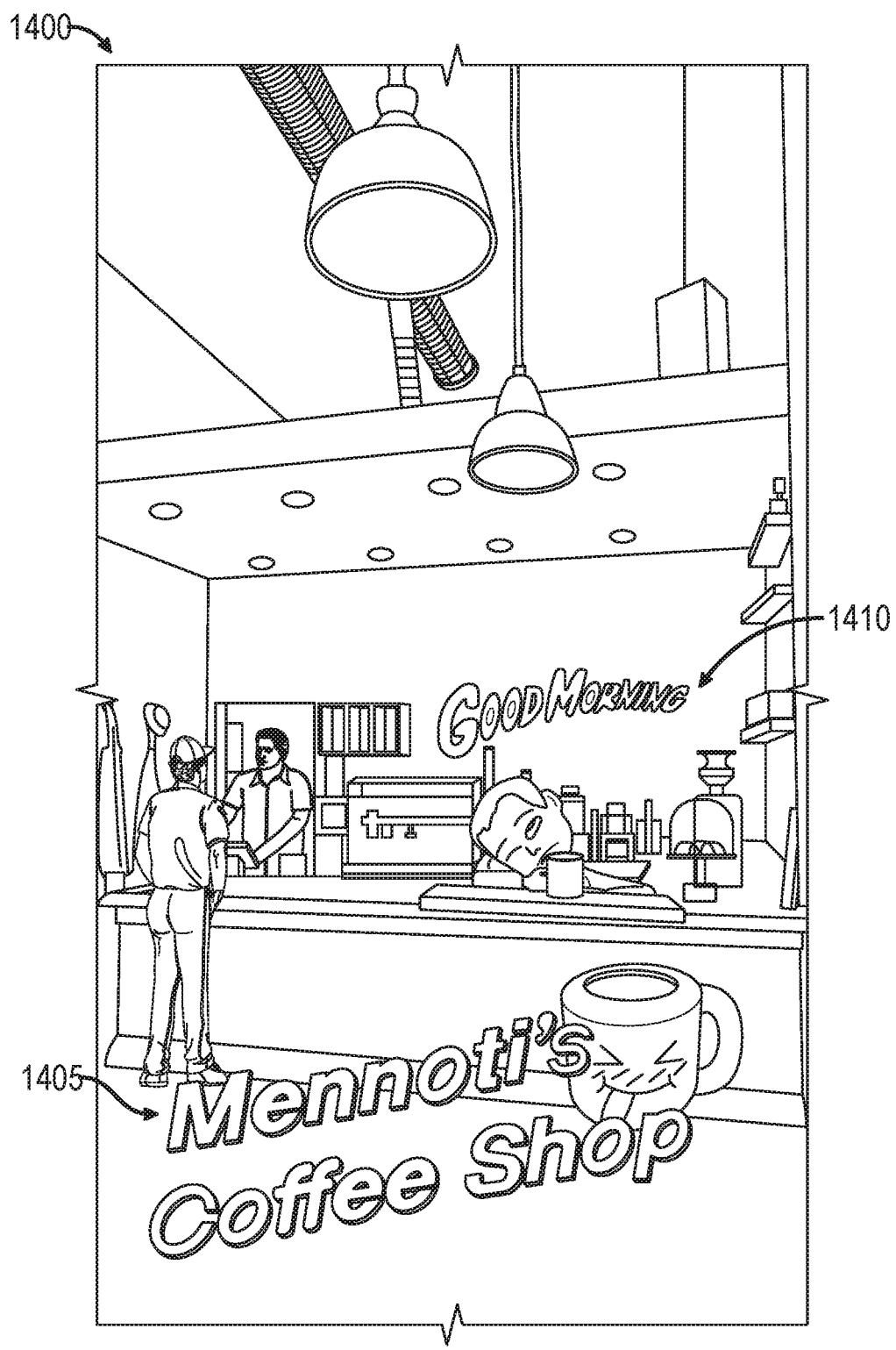
FIG. 14 shows an example user interface for implementing a variation of a physical place related lens object, according to some example embodiments.

FIG. 14 shows an example user interface 1400 for implementing a variation of a physical place 1215 related lens object, according to some example embodiments. The lens object of FIG. 14 is selected at operation 1140 in which the lens context engine 610 determines that the client device 102 is in a sub-area (a coffee shop), and further that the time indicates that it is early in the morning. The preconfigured display elements 1220, 1225 include the sub-area descriptor 1405, which recites the name of the sub-area ("Mennoti's Coffee Shop") and shows a coffee shop avatar. Further, the preconfigured display elements include the avatar 1410 which is preconfigured to show the avatar 1410 as sleepy, and further include a time-related phrase such as "Good Morning".

Figure 15:
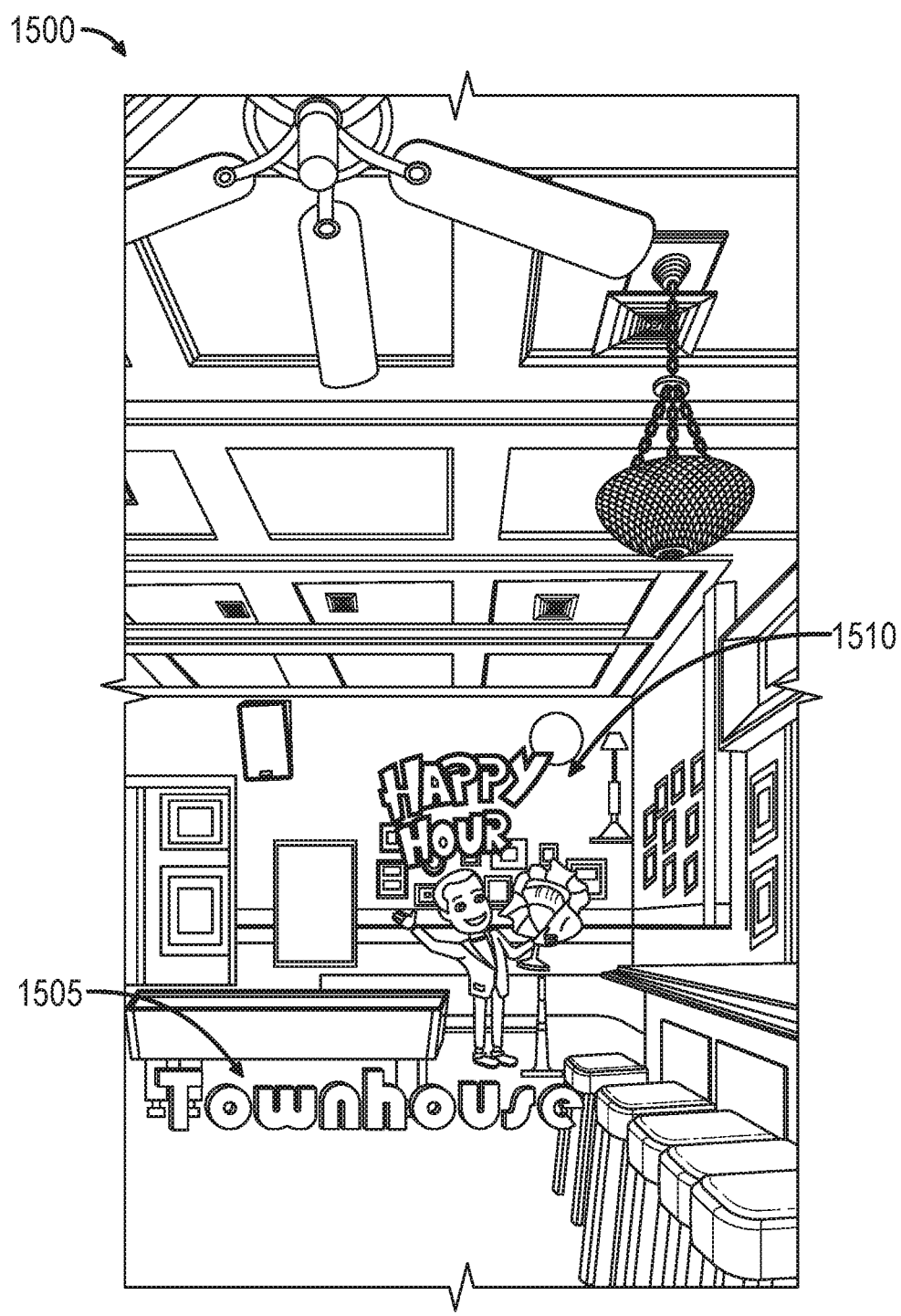
FIG. 15 shows an example user interface for implementing a variation of a physical place related lens object, according to some example embodiments.

FIG. 15 shows an example user interface 1500 for implementing a variation of a physical place 1215 related lens object, according to some example embodiments. The lens object of FIG. 15 is selected at operation 1140 in which the lens context engine 610 determines that the client device 102 is in a sub-area ("Townhouse"), and further that the time indicates that it is happy hour e.g., 5 PM to 8 PM). The preconfigured display elements include the sub-area descriptor 1505, which recites the name of the sub-area ("Townhouse" in a stylized font). Further, the preconfigured display elements include the display element 1510 which is preconfigured to show an avatar well-dressed and holding a tropical cocktail, and further includes a time-based phrase such as "Happy Hour".

It is appreciated that the above are only example phrases, the avatar, fonts, etc. are only mere examples of preconfigured elements selected using context and other variations can be implemented. For example, instead of "Happy Hour", which is time related, the phrase might be related to other features of the sub-area. For example, if Townhouse is well known for having high quality margaritas, the phrase of display element 1510 may recite "Worlds Best Margarita". Further, if Townhouse is currently having a promotion for the items, the phrase may recite "Margaritas only $1 during happy hour!", according to some example embodiments. Other variations can likewise be implemented.

Figure 16:
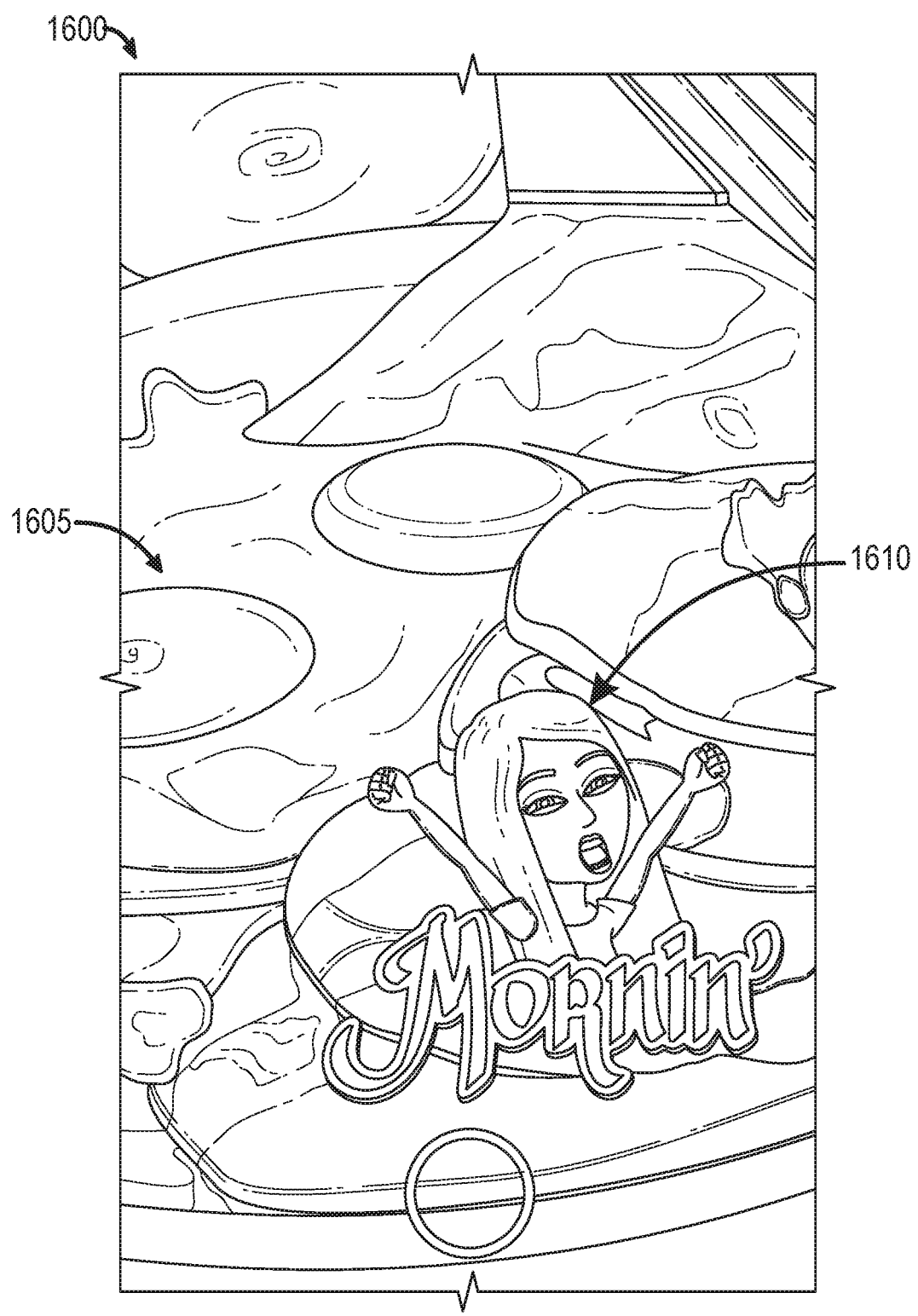
FIG. 16 shows an example user interface for implementing a variation of a depicted item related lens object, according to some example embodiments.

FIG. 16 shows an example user interface 1600 for implementing a variation of a depicted item related lens object, according to some example embodiments. The lens object of FIG. 16 is selected via operation 1155 of FIG. 11, in which the lens context engine 610 uses the depicted items 1605 and the time to select a lens object. In FIG. 16, the live feed 1210 displayed on the screen of the client device 102 depicts pancakes. The sensor engine 620 at operation 1015 can identify the depicted items 1605 as eggs and pancakes using locally executed computer vision algorithms, or alternatively sending one or more images of the items to the server 112, which then can run more rigorous computer vision analysis algorithms to identify the depicted items 1605 as eggs and pancakes. After the items are identified as eggs and pancakes, the local time retrieved from operation 1150 can additionally be used to confirm that the time of day is morning. The preconfigured display elements 1610 of FIG. 16 include an avatar of the user, appearing to be waking up and stretching and a phrase "Mornin'". Other avatars and phrases can likewise be implemented. In this way, preconfigured display elements 1610 can be used to select an object when no general area nor sub-area data is available.

Figure 17:
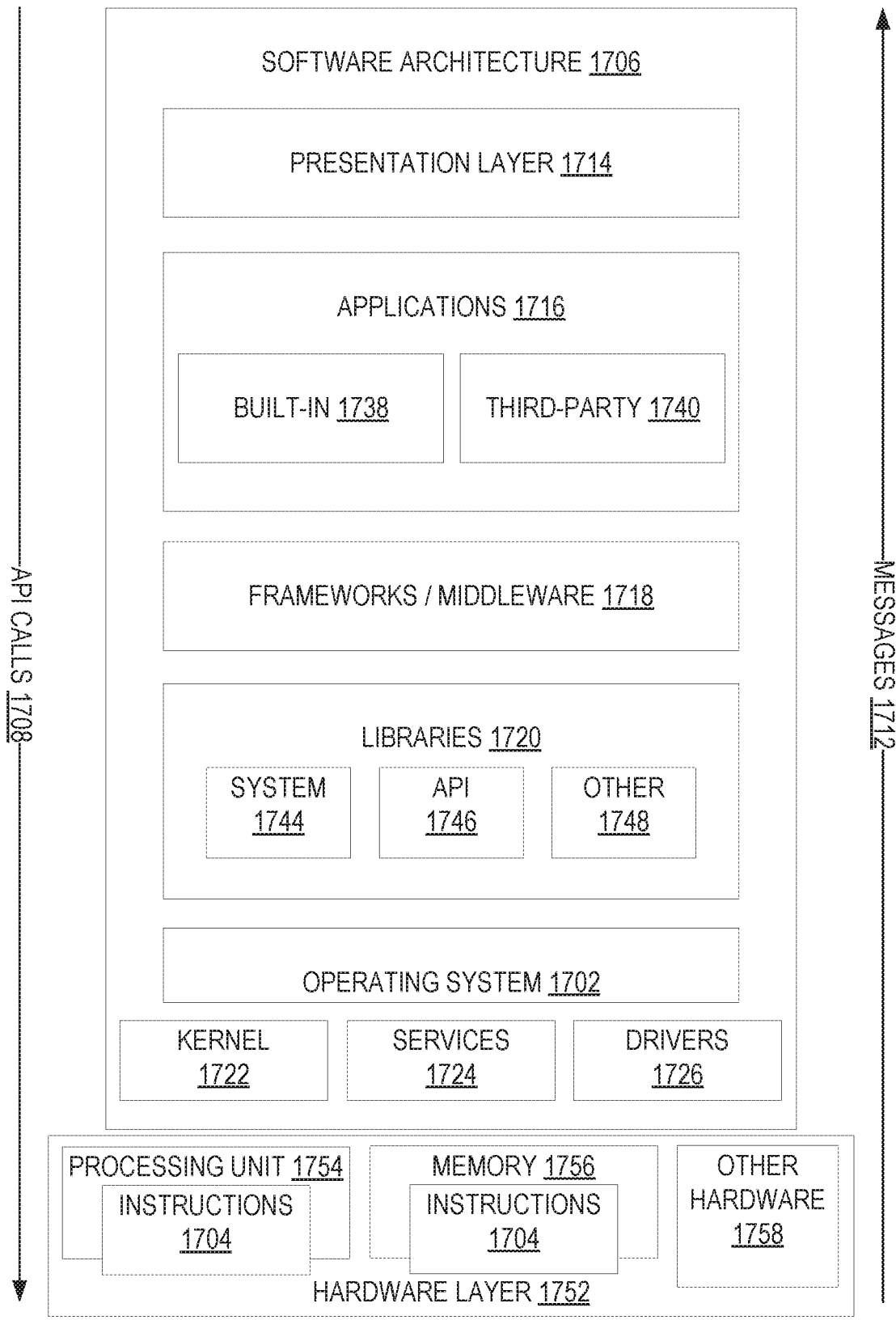
FIG. 17 is a block diagram illustrating a representative software architecture, which may be used in conjunction with various hardware architectures herein described.

FIG. 17 is a block diagram illustrating an example software architecture 1706, which may be used in conjunction with various hardware architectures herein described. FIG. 17 is a non-limiting example of a software architecture, and it will be appreciated that many other architectures may be implemented to facilitate the functionality described herein. The software architecture 1706 may execute on hardware such as a machine 1800 of FIG. 18 that includes, among other things, processors, memory, and I/O components. A representative hardware layer 1752 is illustrated and can represent, for example, the machine 1800 of FIG. 18. The representative hardware layer 1752 includes a processing unit 1754 having associated executable instructions 1704. The executable instructions 1704 represent the executable instructions of the software architecture 1706, including implementation of the methods, components, and so forth described herein. The hardware layer 1752 also includes a memory/storage 1756, which also has the executable instructions 1704. The hardware layer 1752 may also comprise other hardware 1758.

In the example architecture of FIG. 17, the software architecture 1706 may be conceptualized as a stack of layers where each layer provides particular functionality. For example, the software architecture 1706 may include layers such as an operating system 1702, libraries 1720, frameworks/middleware 1718, applications 1716, and a presentation layer 1714. Operationally, the applications 1716 and/or other components within the layers may invoke application programming interface (API) calls 1708 through the software stack and receive a response in the form of messages 1712. The layers illustrated are representative in nature and not all software architectures have all layers. For example, some mobile or special-purpose operating systems may not provide a frameworks/middleware 1718, while others may provide such a layer. Other software architectures may include additional or different layers.

The operating system 1702 may manage hardware resources and provide common services. The operating system 1702 may include, for example, a kernel 1722, services 1724, and drivers 1726. The kernel 1722 may act as an abstraction layer between the hardware and the other software layers. For example, the kernel 1722 may be responsible for memory management, processor management (e.g., scheduling), component management, networking, security settings, and so on. The services 1724 may provide other common services for the other software layers. The drivers 1726 are responsible for controlling or interfacing with the underlying hardware. For instance, the drivers 1726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1720 provide a common infrastructure that is used by the applications 1716 and/or other components and/or layers. The libraries 1720 provide functionality that allows other software components to perform tasks in an easier fashion than by interfacing directly with the underlying operating system 1702 functionality (e.g., kernel 1722, services 1724, and/or drivers 1726). The libraries 1720 may include system libraries 1744 (e.g., C standard library) that may provide functions such as memory allocation functions, string manipulation functions, mathematical functions, and the like. In addition, the libraries 1720 may include API libraries 1746 such as media libraries (e.g., libraries to support presentation and manipulation of various media formats such as MPEG-4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1720 may also include a wide variety of other libraries 1748 to provide many other APIs to the applications 1716 and other software components/modules.

The frameworks/middleware 1718 provide a higher-level common infrastructure that may be used by the applications 1716 and/or other software components/modules. For example, the frameworks/middleware 1718 may provide various graphic user interface (GUI) functions, high-level resource management, high-level location services, and so forth. The frameworks/middleware 1718 may provide a broad spectrum of other APIs that may be utilized by the applications 1716 and/or other software components/modules, some of which may be specific to a particular operating system 1702 or platform.

The applications 1716 include built-in applications 1738 and/or third-party applications 1740. Examples of representative built-in applications 1738 may include, but are not limited to, a contacts application, a browser application, a book reader application, a location application, a media application, a messaging application, and/or a game application. The third-party applications 1740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1740 may invoke the API calls 1708 provided by the mobile operating system (such as the operating system 1702) to facilitate functionality described herein.

The applications 1716 may use built-in operating system functions (e.g., kernel 1722, services 1724, and/or drivers 1726), libraries 1720, and frameworks/middleware 1718 to create user interfaces to interact with users of the system. Alternatively, or additionally, in some systems, interactions with a user may occur through a presentation layer, such as the presentation layer 1714. In these systems, the application/component "logic" can be separated from the aspects of the application/component that interact with a user.

Figure 18:
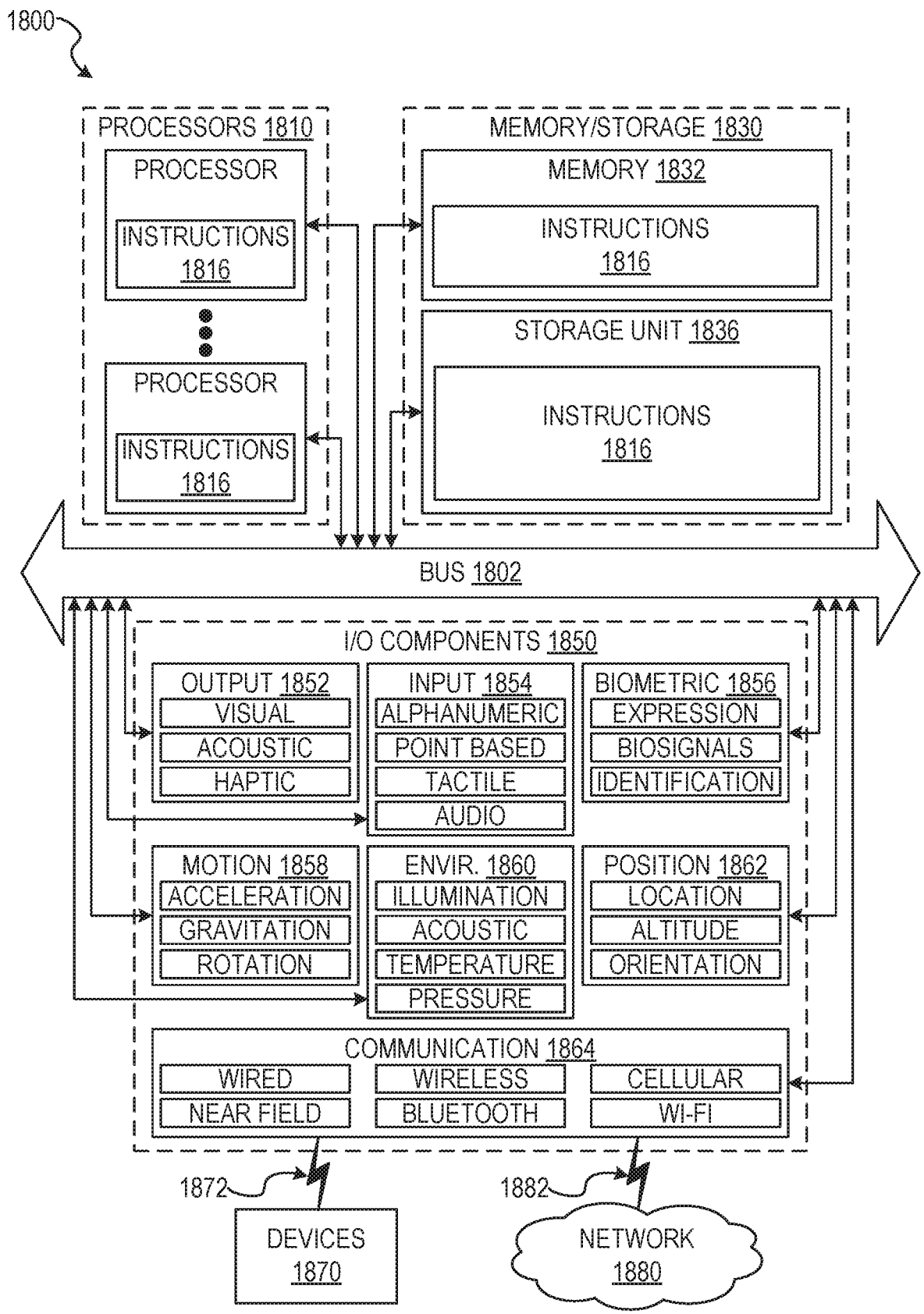
FIG. 18 is a block diagram illustrating components of a machine, according to some example embodiments, able to read instructions from a machine-readable medium (e.g., a machine-readable storage medium) and perform any one or more of the methodologies discussed herein.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. As such, the instructions 1816 may be used to implement modules or components described herein. The instructions 1816 transform the general, non-programmed machine 1800 into a particular machine 1800 programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone 1205, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines that individually or jointly execute the instructions 1816 to perform any one or more of the methodologies discussed herein.

The machine 1800 may include processors 1810, memory/storage 1830, and I/O components 1850, which may be configured to communicate with each other such as via a bus 1802. The memory/storage 1830 may include a memory 1832, such as a main memory, or other memory storage, and a storage unit 1836, both accessible to the processors 1810 such as via the bus 1802. The storage unit 1836 and memory 1832 store the instructions 1816 embodying any one or more of the methodologies or functions described herein. The instructions 1816 may also reside, completely or partially, within the memory 1832, within the storage unit 1836, within at least one of the processors 1810 (e.g., within the processor's cache memory), or any suitable combination thereof, during execution thereof by the machine 1800. Accordingly, the memory 1832, the storage unit 1836, and the memory of the processors 1810 are examples of machine-readable media.

The I/O components 1850 may include a wide variety of components to receive input, provide output, produce output, transmit information, exchange information, capture measurements, and so on. The specific I/O components 1850 that are included in a particular machine 1800 will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environment components 1860, or position components 1862 among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1858 may include acceleration sensor components (e.g., accelerometer), gravitation sensor components, rotation sensor components (e.g., gyroscope), and so forth. The environment components 1860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors gas sensors to detect concentrations of hazardous gases for safety or to measure pollutants in the atmosphere), or other components that may provide indications, measurements, or signals corresponding to a surrounding physical environment. The position components 1862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872 respectively. For example, the communication components 1864 may include a network interface component or other suitable device to interface with the network 1880. In further examples, the communication components 1864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a Universal. Serial Bus (USB)).

Moreover, the communication components 1864 may detect identifiers or include components operable to detect identifiers. For example, the communication components 1864 may include radio frequency identification (RFID) tag reader components, NFC smart tag detection components, optical reader components (e.g., an optical sensor to detect one-dimensional barcodes such as Universal. Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1864, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 1816 for execution by the machine 1800, and includes digital or analog communications signals or other intangible media to facilitate communication of such instructions 1816. Instructions 1816 may be transmitted or received over the network 1880 using a transmission medium via a network interface device and using any one of a number of well-known transfer protocols.

"CLIENT DEVICE" in this context refers to any machine 1800 that interfaces to a communications network 1880 to obtain resources from one or more server systems or other client devices 102. A client device 102 may be, but is not limited to, a mobile phone, desktop computer, laptop, PDA, smartphone 1205, tablet, ultrabook, netbook, multi-processor system, microprocessor-based or programmable consumer electronics system, game console, set-top box, or any other communication device that a user may use to access a network 1880.

"COMMUNICATIONS NETWORK" in this context refers to one or more portions of a network 1880 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1880 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1816 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1816. The term "machine-readable medium" shall also be taken to include any medium, or combination of Multiple media, that is capable of storing instructions 1816 (e.g., code) for execution by a machine 1800, such that the instructions 1816, when executed by one or more processors 1810 of the machine 1800, cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1812 or a group of processors 1810) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1800) uniquely tailored to perform the configured functions and are no longer general-purpose processors 1810. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1812 configured by software to become a special-purpose processor, the general-purpose processor 1812 may be configured as respectively different special-purpose processors (e.g., comprising different hardware components) at different times. Software accordingly configures a particular processor 1812 or processors 1810, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1810 that are temporarily configured (e.g., by software) or permanently configured to perform the relevant operations. Whether temporarily or permanently configured, such processors 1810 may constitute processor-implemented components that operate to perform one or more operations or functions described herein. As used herein, "processor-implemented component" refers to a hardware component implemented using one or more processors 1810. Similarly, the methods described herein may be at least partially processor-implemented, with a particular processor 1812 or processors 1810 being an example of hardware. For example, at least some of the operations of a method may be performed by one or more processors 1810 or processor-implemented components. Moreover, the one or more processors 1810 may also operate to support performance of the relevant operations in a "cloud computing" environment or as a "software as a service" (SaaS). For example, at least some of the operations may be performed by a group of computers (as examples of machines 1800 including processors 1810), with these operations being accessible via a network 1880 (e.g., the Internet) and via one or more appropriate interfaces (e.g., an API). The performance of certain of the operations may be distributed among the processors 1810, not only residing within a single machine 1800, but deployed across a number of machines 1800. In some example embodiments, the processors 1810 or processor-implemented components may be located in a single geographic location (e.g., within a home environment, an office environment, or a server farm). In other example embodiments, the processors 1810 or processor-implemented components may be distributed across a number of geographic locations.

"PROCESSOR" in this context refers to any circuit or virtual circuit (a physical circuit emulated by logic executing on an actual processor 1812) that manipulates data values according to control signals (e.g., "commands", "op codes", "machine code", etc.) and which produces corresponding output signals that are applied to operate a machine 1800. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1810 may further be a multi-core processor 1810 having two or more independent processors 1812, 1814 (sometimes referred to as "cores") that may execute instructions 1816 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A system comprising:
   one or more processors of a machine;
   a camera;
   a display device;
   one or more sensors; and
   a memory storing instructions that, when executed by the one or more processors, cause the machine to perform operations comprising:
   receive, from a network platform, a plurality of lens virtual objects corresponding to different geographic locations, each of the plurality of lens virtual objects comprising one or more navigational display elements uploaded to the network platform by submitting client devices;
   generate location data using the one or more sensors;
   select a lens virtual object from the plurality of lens virtual objects based on the location data corresponding to a geographic location of the selected lens virtual object;

determine heading data using the geographic location of the selected lens virtual object, the heading data specifying a direction of the geographic location relative to a current orientation of the system; and cause a presentation, on live video generated by the camera and displayed on the display device, of a navigational direction display element in the uploaded one or more navigational display elements associated with the selected lens virtual object, the navigational direction display element indicating the direction to the geographic location relative to the current orientation of the system.

2. The system of claim 1, the operations further comprising:

identify an update to the heading data that indicates a physical place is in a field of view of the live video, the update to the heading data caused in response to physical movement of the machine; and responsive to the physical place being in the field of view of the live video, display one or more navigational physical place display elements of the selected lens virtual object, the one or more navigational physical place display elements indicating location of the physical place within the live video.

3. The system of claim 1, wherein the plurality of lens virtual objects comprises a first lens virtual object and a second lens virtual object, the first lens virtual object comprising a first set of one or more navigational display elements uploaded by a first submitting client device, the second lens virtual object comprising a second set of one or more navigational display elements uploaded by a second submitting client device.

4. The system of claim 3, wherein the first set of one or more navigational display elements includes a first text in a first font and the second set of one or more navigational display elements includes a second text in a second font that is different from the first font.

5. The system of claim 3, wherein the first set of one or more navigational display elements includes a first visual logo and the second set of one or more navigational display elements have a second visual logo that is different than the first visual logo.

6. The system of claim 2, wherein the physical place is obfuscated in the field of view by one or more physical objects, and wherein the one or more navigational physical place display elements are overlaid over the one or more physical objects in the live video.

7. The system of claim 1, wherein the one or more sensors comprise a Global Positioning System (GPS) sensor and a compass sensor, and wherein the location data is generated by the GPS sensor and the heading data is generated by the compass sensor.

8. The system of claim 1, wherein the location data includes latitude and longitude data generated by the one or more sensors.

9. The system of claim 1, wherein the navigational direction display element is at least one of: an arrow or a direction pointer.

10. The system of claim 7, wherein the operations that determine the heading data include operations comprising:

identifying an absolute bearing of the geographic location; and dynamically updating the heading data using the compass sensor as the compass sensor is physically moved.

11. The system of claim 2, wherein the update indicates that the current orientation coincides with a bearing of the geographic location.

12. The system of claim 2, wherein the operations that indicate the physical place is in the live video use operations comprising:

determining a difference between the current orientation of the system and a bearing of the geographic location.

13. The system of claim 2, wherein the one or more navigational physical place display elements are dynamically displayed on frames of the live video.

14. A method comprising:

receiving, by a client device from a network Platform, a plurality of lens virtual objects corresponding to different geographic locations, each of the plurality of lens virtual objects comprising one or more navigational display elements uploaded to the network platform by submitting client devices;

generating location data using one or more sensors of the client device;

selecting a lens virtual object from the plurality of lens virtual objects based on the location data generated by the one or more sensors of the client device corresponding to a geographic location of the selected lens virtual object;

determining heading data using the geographic location of the selected lens virtual object, the heading data specifying a direction of the geographic location relative to a current orientation of the client device; and causing a presentation, on live video generated and displayed by the client device, of a navigational direction display element in the uploaded one or more navigational display elements associated with the selected lens virtual object, the navigational direction display element indicating the direction to the geographic location relative to the current orientation of the client device.

15. The method of claim 14, further comprising:

identifying an update to the heading data that indicates a physical place is in a field of view of the live video, the update to the heading data caused in response to physical movement of the client device; and responsive to the physical place being in the field of view of the live video, displaying one or more navigational physical place display elements of the selected lens virtual object, the one or more navigational physical place display elements indicating a location of the physical place within the live video.

16. The method of claim 14, wherein the plurality of lens virtual objects comprises a first lens virtual object and a second lens virtual object, the first lens virtual object comprising a first set of one or more navigational display elements uploaded by a first submitting client device, the second lens virtual object comprising a second set of one or more navigational display elements uploaded by a second submitting client device.

17. The method of claim 16, wherein the navigational direction display element is at least one of: an arrow, a direction pointer.

18. The method of claim 16, wherein the first set of one or more navigational display elements includes a first visual logo and the second set of one or more navigational display elements have a second visual logo that is different than the first visual logo.

19. A machine-readable storage device embodying instructions that, when executed by a machine, cause the machine to perform operations comprising:

receive, from a network platform, a plurality of lens virtual objects corresponding to different geographic locations, each of the plurality of lens virtual objects comprising one or more navigational display elements uploaded to the network platform by submitting client devices;

generate location data using one or more sensors;

select a lens virtual object from the plurality of lens virtual objects based on the location data corresponding to a geographic location of the selected lens virtual object;

determine heading data using the geographic location of the selected lens virtual object, the heading data specifying a direction of the geographic location relative to a current orientation; and cause a presentation, on live video generated by a camera and displayed on a display device, of a navigational direction display element in the uploaded one or more navigational display elements associated with the selected lens virtual object, the navigational direction display element indicating the direction to the geographic location relative to the current orientation.

20. The machine-readable storage device of claim 19, the operations further comprising:

identifying an update to the heading data that indicates the geographic location is in a field of view of the live video, the update the heading data caused in response to physical movement; and responsive to the geographic location being in the field of view of the live video, displaying one or more navigational physical place display elements of the selected lens virtual object, the one or more navigational physical place display elements indicating a location of a physical place within the live video.

* * * * *

UNITED STATES PATENT AND TRADEMARK OFFICE
CERTIFICATE OF CORRECTION

PATENT NO. : 10,565,795 B2  
APPLICATION NO. : 15/654429  
DATED : February 18, 2020  
INVENTOR(S) : Charlton et al.

Page 1 of 1

It is certified that error appears in the above-identified patent and that said Letters Patent is hereby corrected as shown below:

In the Claims

In Column 25, Line 23, in Claim 2, after "indicating", insert --a--

In Column 26, Line 10, in Claim 14, delete "device" and insert --device,-- therefor In Column 26, Line 10, in Claim 14, delete "Platform," and insert --platform,-- therefor In Column 27, Line 7, in Claim 19, delete "object" and insert --object;-- therefor In Column 27, Line 23, in Claim 20, after "update", insert --to--

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*